US009929435B2

(12) United States Patent
Cai et al.

(10) Patent No.: US 9,929,435 B2
(45) Date of Patent: Mar. 27, 2018

(54) ELECTROLYTE STRUCTURE FOR METAL BATTERIES

(71) Applicants: GM GLOBAL TECHNOLOGY OPERATIONS LLC, Detroit, MI (US); THE REGENTS OF THE UNIVERSITY OF CALIFORNIA, Oakland, CA (US)

(72) Inventors: Mei Cai, Bloomfield Hills, MI (US); Yunfeng Lu, Los Angeles, CA (US); Li Yang, Troy, MI (US); Fang Dai, Troy, MI (US); Jingmei Shen, Sterling Heights, MI (US); Addis Fuhr, Hermosa Beach, CA (US); Li Shen, Los Angeles, CA (US)

(73) Assignees: GM GLOBAL TECHNOLOGY OPERATIONS LLC, Detroit, MI (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 56 days.

(21) Appl. No.: 15/055,306

(22) Filed: Feb. 26, 2016

(65) Prior Publication Data
US 2016/0254567 A1    Sep. 1, 2016

Related U.S. Application Data

(60) Provisional application No. 62/121,976, filed on Feb. 27, 2015, provisional application No. 62/194,019, filed on Jul. 17, 2015.

(51) Int. Cl.
*H01M 10/0565* (2010.01)
*H01M 10/0525* (2010.01)
(Continued)

(52) U.S. Cl.
CPC ..... *H01M 10/0564* (2013.01); *H01M 10/052* (2013.01); *H01M 4/382* (2013.01);
(Continued)

(58) Field of Classification Search
CPC .......... H01M 10/0564; H01M 10/052; H01M 2300/0088; H01M 2300/0065;
(Continued)

(56) References Cited

U.S. PATENT DOCUMENTS

| | | | |
|---|---|---|---|
| 2012/0077092 A1* | 3/2012 | Lee | C08J 5/2206 429/307 |
| 2014/0045074 A1* | 2/2014 | Wiers | H01M 10/056 429/306 |
| 2015/0050543 A1* | 2/2015 | Christensen | H01M 2/18 429/144 |

OTHER PUBLICATIONS

Furukawa, et al.; "The Chemistry and Applications of Metal-Organic Frameworks"; Science; 341; 6149; 2013.
(Continued)

*Primary Examiner* — Stewart A Fraser
(74) *Attorney, Agent, or Firm* — Harness, Dickey & Pierce, P.L.C.

(57) ABSTRACT

An electrolyte structure includes a metal organic framework (MOF) material defining a plurality of pores. Anions are bound to respective metal atoms of the MOF material. The bound anions are located within each of the plurality of pores of the MOF material. Solvated cations are present within each of the plurality of pores.

13 Claims, 14 Drawing Sheets
(1 of 14 Drawing Sheet(s) Filed in Color)

(51) Int. Cl.
*H01M 10/0564* (2010.01)
*H01M 10/052* (2010.01)
*H01M 4/38* (2006.01)
*H01M 4/525* (2010.01)

(52) U.S. Cl.
CPC ........ *H01M 4/525* (2013.01); *H01M 2220/20* (2013.01); *H01M 2300/0065* (2013.01); *H01M 2300/0085* (2013.01); *H01M 2300/0088* (2013.01); *Y02E 60/122* (2013.01); *Y02T 10/7011* (2013.01)

(58) Field of Classification Search
CPC ......... H01M 4/525; H01M 2300/0085; H01M 4/382; H01M 2220/20; Y02T 10/7011; Y02E 60/122
See application file for complete search history.

(56) References Cited

OTHER PUBLICATIONS

Ameloot, et al; "Ionic Conductivity in the Metal Organic Framework UiO-66 by Dehydration and Insertion of Lithium tert-Butoxide"; Chemistry—A European Journal; 19; 18; 5533-5536; 2013.

Wiers, et al.; "A Solid Lithium Electrolyte via Addition of Lithium Isopropoxide to a Metal-Ogranic Framework with Open Metal Sites"; Journal of the American Chemical Society; 133; (37); 14522-14525; 2011.

Gu, et al.; "High-connected mesopouous metal-organic framework"; Chemical Communications; 46; (39), 7400-7402; 2010.

Zou, et al. "Microwave-Assisted Synthesis of HKUST-1 and Functionalized HKUST-1-@H3PW12O40: Selective Adsorption of Heavy Metal Ions in Water Nalyzed with Synchrotron Radiation" ChemPhysChem; 14; (12); 2825-2832, 2013.

* cited by examiner

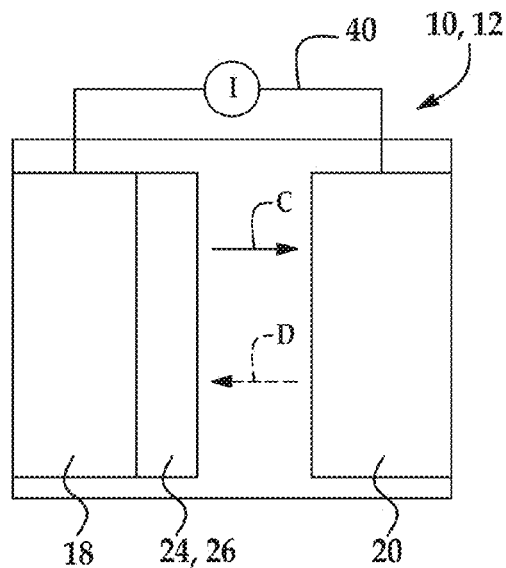
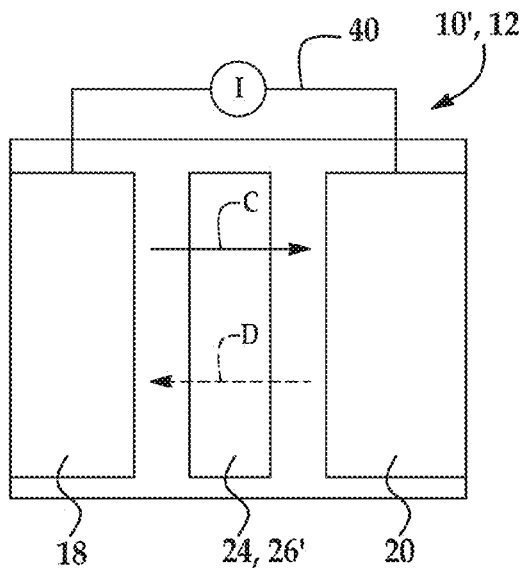
FIG. 1A
FIG. 1B
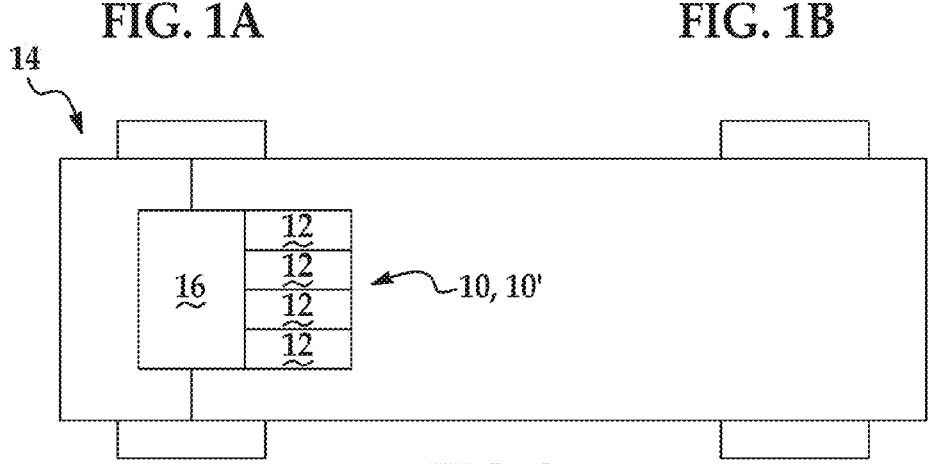
FIG. 2
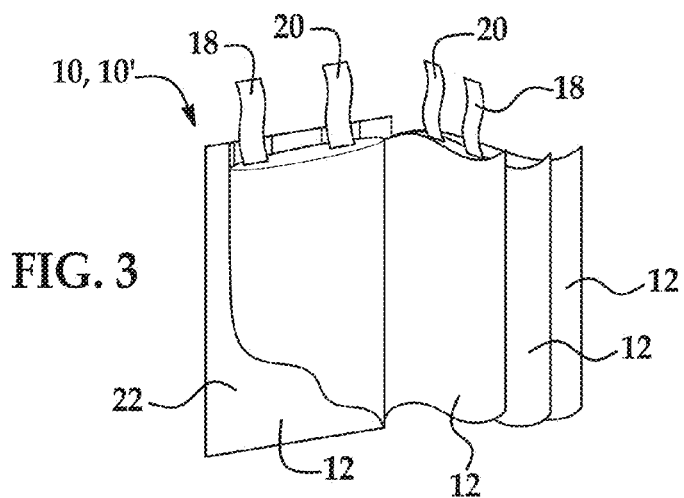
FIG. 3

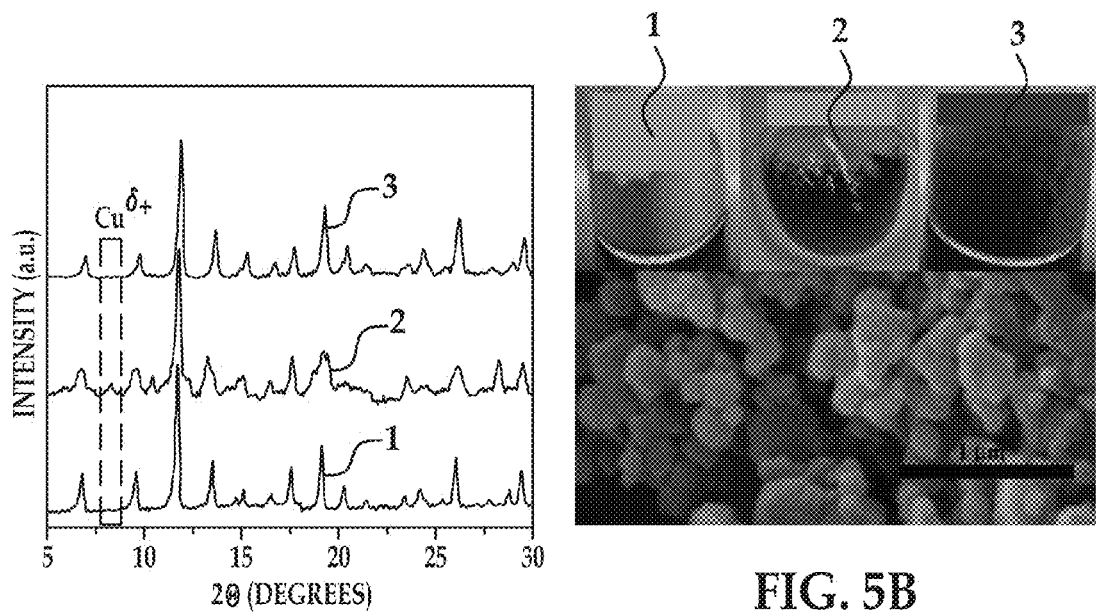
FIG. 5A
FIG. 5B
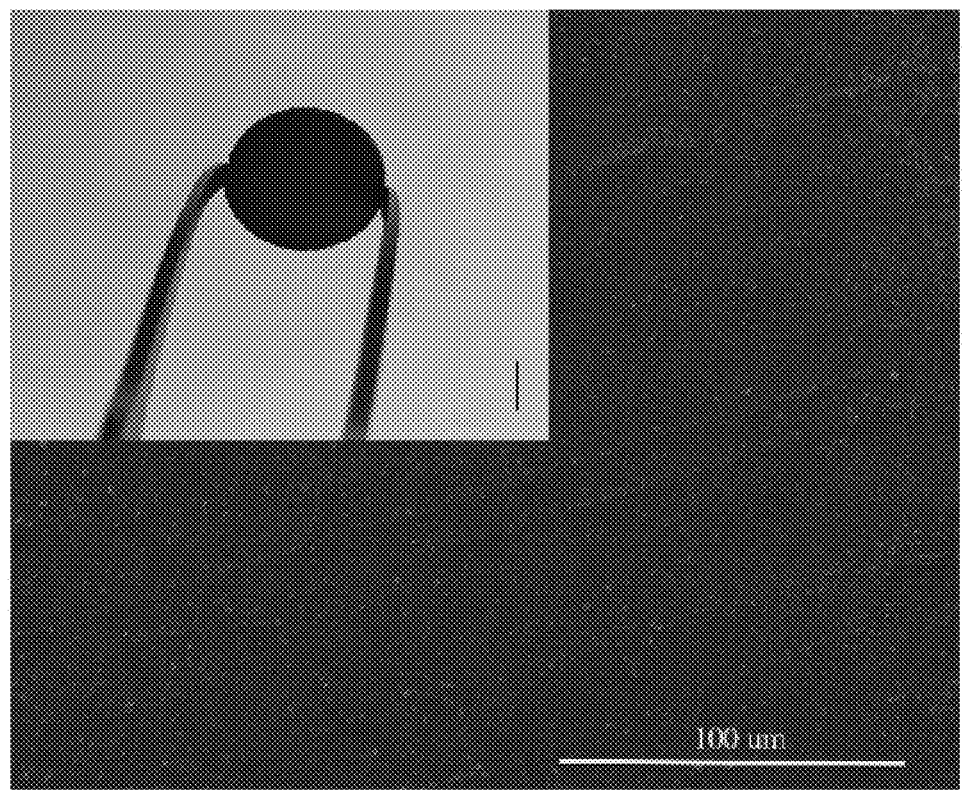
FIG. 6

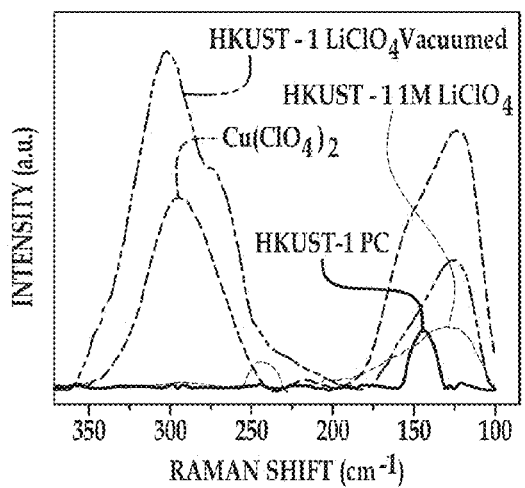
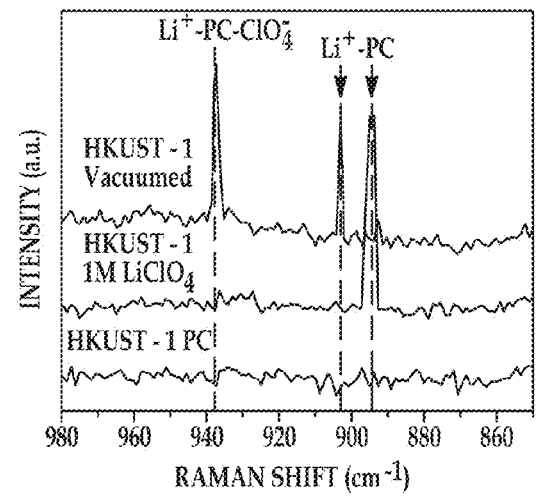
FIG. 8A  FIG. 8B
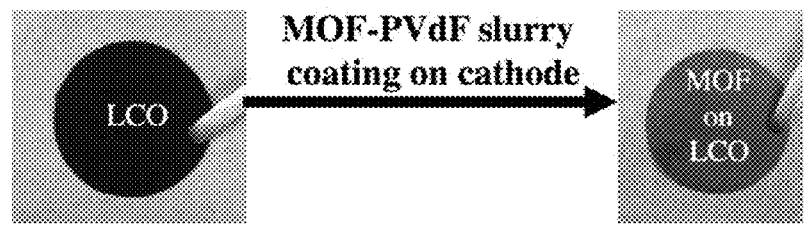
FIG. 9A
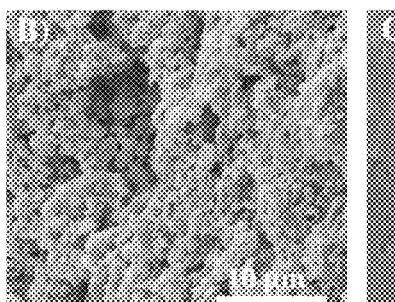 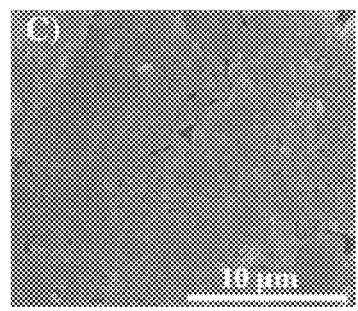 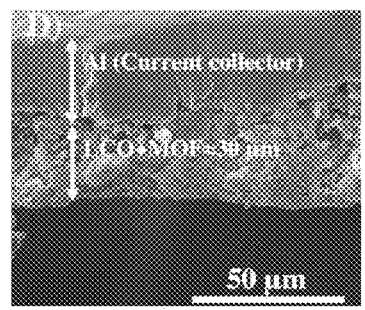
FIG. 9B  FIG. 9C  FIG. 9D

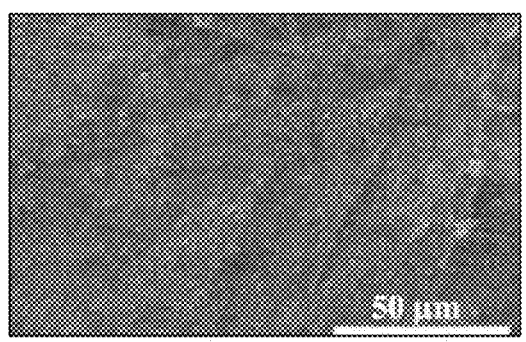
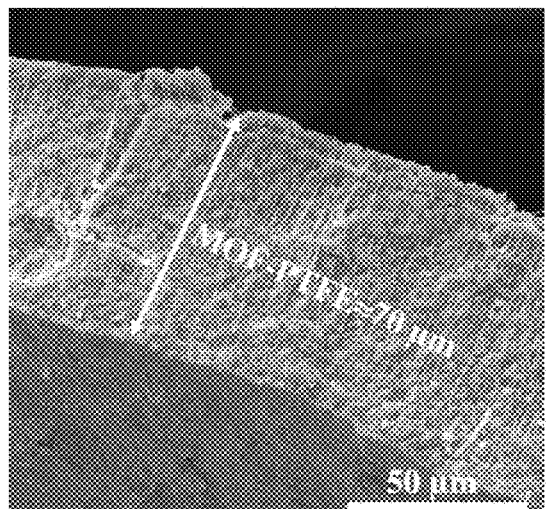
FIG. 10A
FIG. 10B
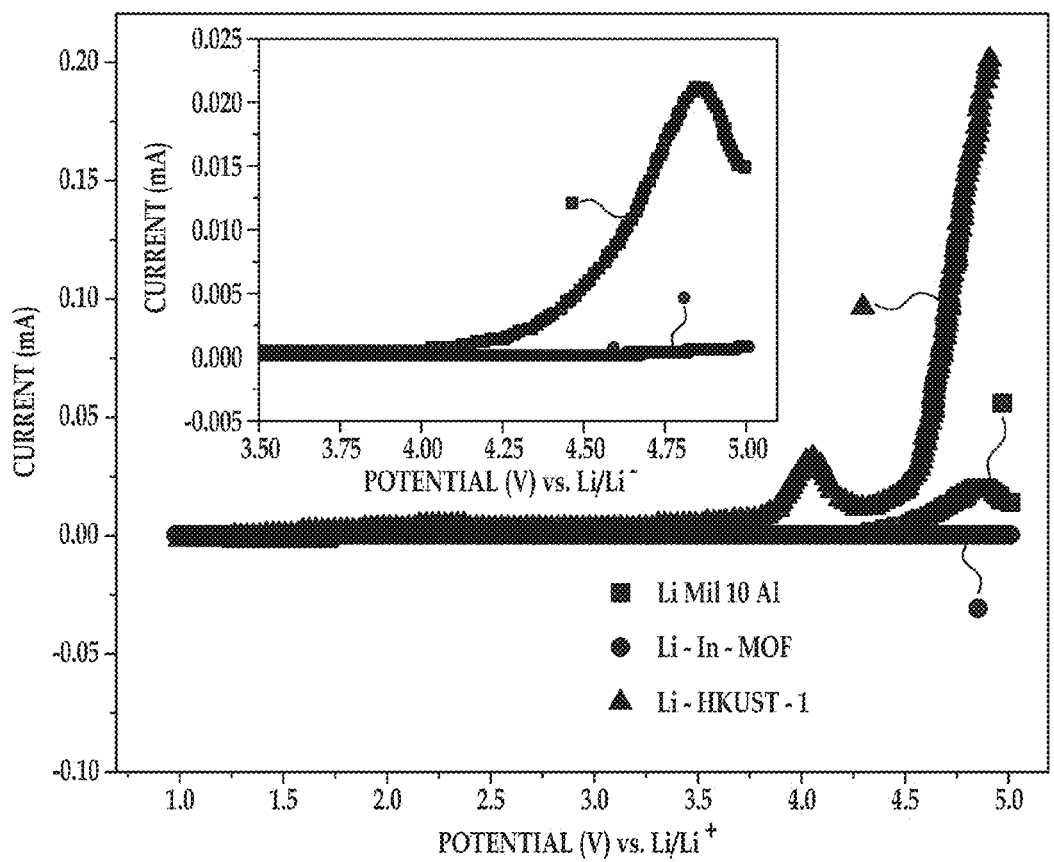
FIG. 11A

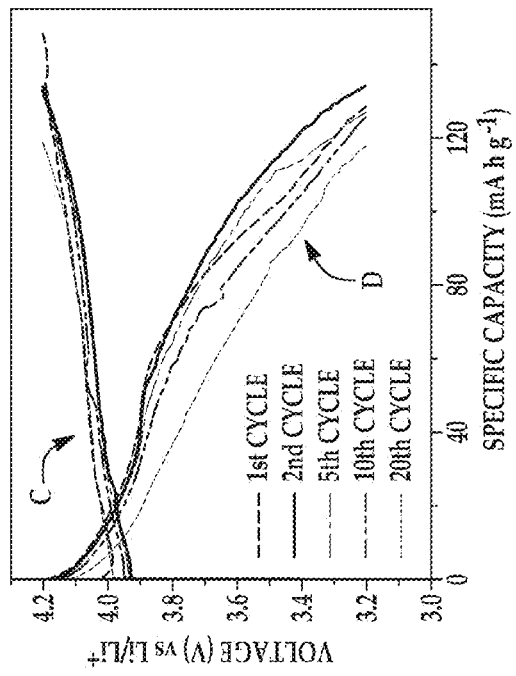
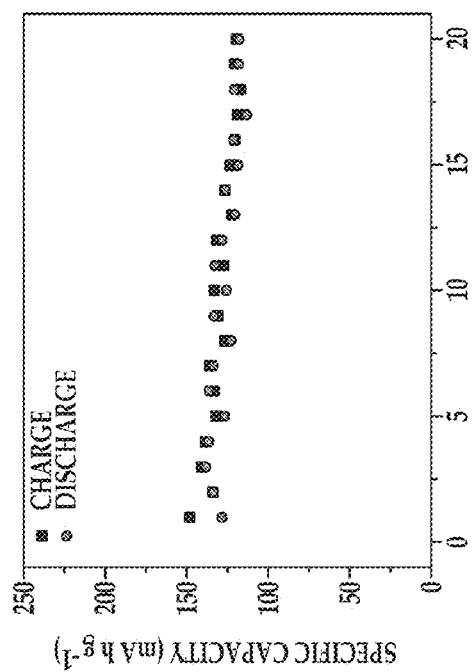
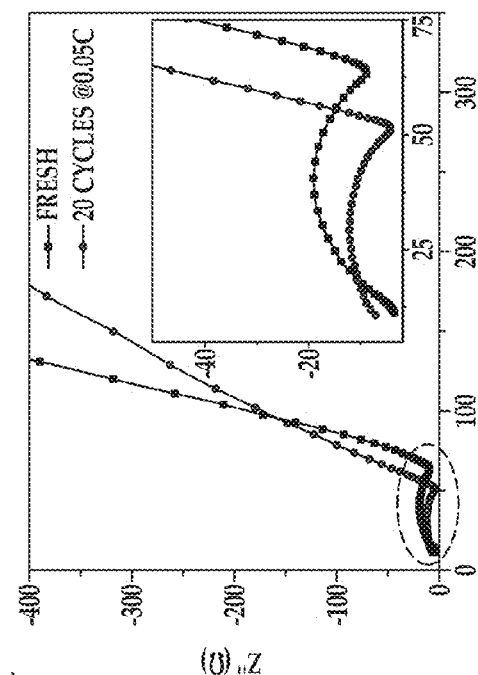
FIG. 14A
FIG. 14B
FIG. 14C

ELECTROLYTE STRUCTURE FOR METAL BATTERIES

CROSS-REFERENCE TO RELATED APPLICATIONS

This application claims the benefit of U.S. Provisional Application Ser. No. 62/121,976 filed Feb. 27, 2015 and entitled "Gel Electrolyte Based on Metal-Organic Frameworks" and U.S. Provisional Application Ser. No. 62/194,019, filed Jul. 17, 2015 and entitled "Electrolyte Structure for Metal Batteries", both of which are incorporated by reference herein in their entirety.

TECHNICAL FIELD

The present disclosure is related to an electrolyte structure for metal batteries.

BACKGROUND

Secondary, or rechargeable, lithium-based batteries are often used in many stationary and portable devices, such as those encountered in the consumer electronic, automobile/automotive, medical equipment, machinery, robotic, and aerospace industries. In the automotive industry, lithium-based batteries may be suitable for electric-based vehicles, such as hybrid electric vehicles (REV), battery electric vehicles (BEV), plug-in HEVs, and extended-range electric vehicles (EREV). The lithium class of batteries has gained popularity for various reasons including a relatively high energy density, high power capability, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A and 1B are schematic, diagrammatic views of a rechargeable battery having a single electrochemical cell which includes respective examples of the electrolyte structure disclosed herein;

FIG. 2 is a schematic, plan view of a vehicle including a rechargeable battery having a plurality of electrochemical cells and an electric motor;

FIG. 3 is a schematic, perspective view of a portion of the rechargeable battery of FIG. 2, including a plurality of electrochemical cells;

FIGS. 5A and 5B respectively illustrate (A) x-ray diffraction (XRD) spectra of as-synthesized, degassed, and electrolyte-filled HKUST-1, and (B) black and white photographs (Inset) of the as-synthesized, degassed, and electrolyte-filled HKUST-1 and a scanning electron microscope (SEM) image of the as-synthesized HKUST-1;

FIG. 6 illustrates a black and white photograph (left corner) and a SEM image of a HKUST-1 pellet;

FIGS. 8A and 8B are graphs depicting the Raman spectra of HKUST-1 soaked with propylene carbonate (PC), HKUST-1 soaked with 1M $LiCLO_4$ in PC, HKUST-1 soaked with 1M $LiCLO_4$ in PC followed by PC removal by vacuum, and/or $Cu(ClO_4)_2$, where the spectra show the binding of $ClO_4^-$ with open metal sites, as well as the interactions among $Li^+$, $ClO_4^-$ and PC;

FIGS. 9A through 9D respectively depict (A) a photograph depicting an LCO cathode with an In-MOF layer after pressing, and SEM images of the coated cathodes before pressing (B), and after pressing (C, D);

FIGS. 10A and 10B respectively depict (A) top-down and (B) cross-section SEM images of a composite membrane made from In-MOF and polytetrafluoroethylene (PTFE) with hot pressing (B) and without hot pressing (A);

FIGS. 11A through 11C are graphs of (A) linear sweep voltammetry (LSV) of several MOF candidates up to 5.0 V (to check anodic stability), (B) LSV of In-MOF to −0.5 V (to check cathodic stability and reversibility of Li plating/stripping), and (C) voltage versus time of a Li/Li symmetric cell made with an In-MOF semi-solid electrolyte with good interfacial chemical stability and its comparison with a Li/Li symmetric cell made with a commercial polypropylene (PP) separator immersed in an equivalent amount of liquid electrolyte;

FIGS. 14A through 14C respectively depict (A) cycling stability (in terms of specific capacity (mAh $g^{-1}$) versus cycle number), (B) galvanostatic charge/discharge profiles (in terms of voltage (V) vs $Li/Li^+$ versus specific capacity (mAh $g^{-1}$)), and (C) electrochemical impedance spectroscopy (EIS) of a coin cell with In-MOF electrolytes and LCO cathode at 0.05 C between 3.2V and 4.2V;

DETAILED DESCRIPTION

Figure 4A:
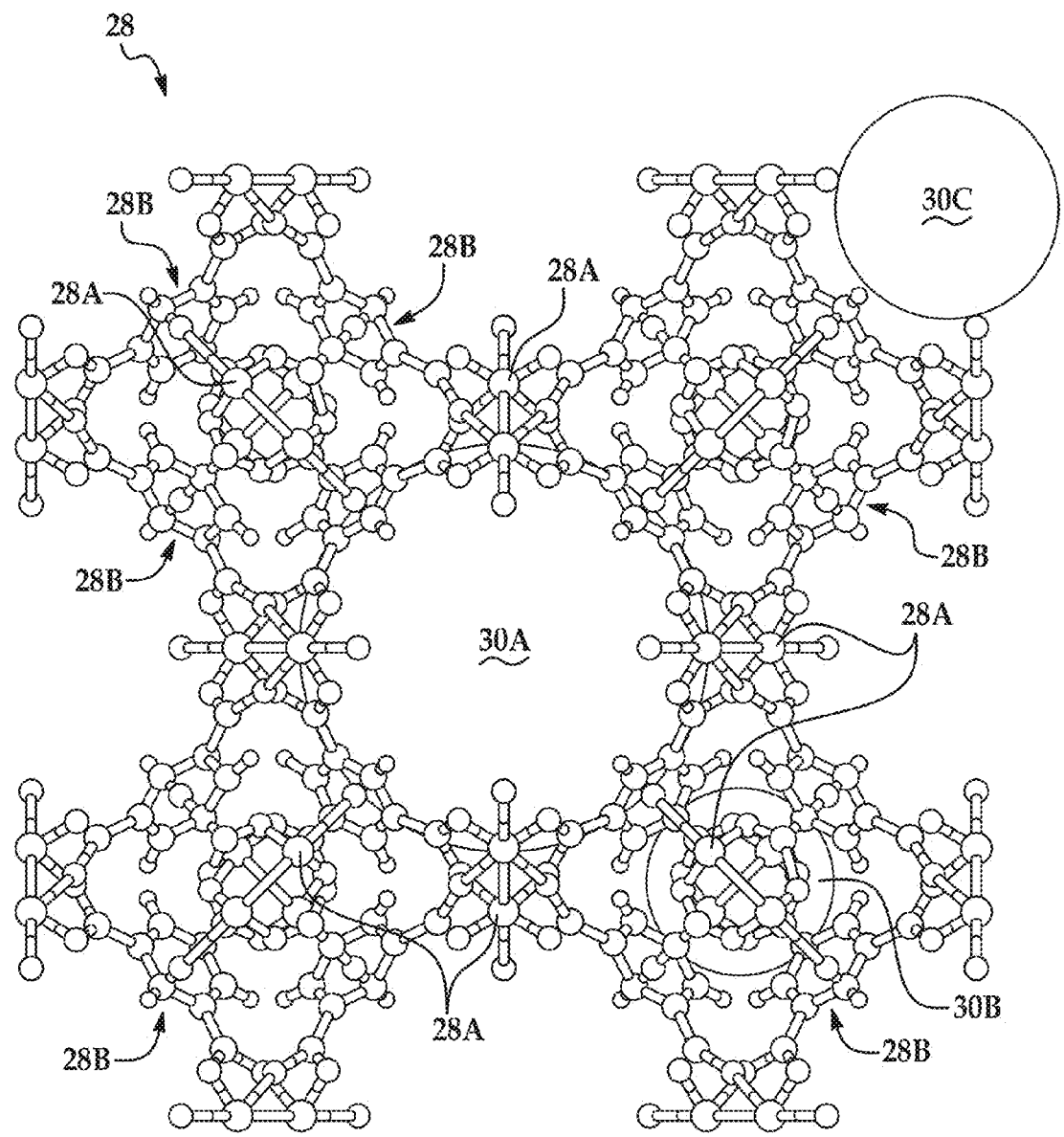
FIGS. 4A through 4C respectively illustrate (A) a scheme of the metal organic framework (MOF) material HKUST-1, made from copper (28A) and benzene tricarboxylic acid (BTC) ligands (28B), which forms a rigid framework with 1.1 nm pore diameters, (B) a schematic, perspective view of the HKUST-1 framework with ionic channels and solvated ions within the ionic channels, and (C) a cross view of the HKUST-1 framework with the ionic channels showing the binding of $ClO_4^-$ to the open copper sites and the free, solvated $Li^+$ ions within the ionic channels.

In the examples disclosed herein, electrolyte structures having ion/ionic-channels are formed from biomimetic metal-organic frameworks (MOFs). The MOF functions as the channel scaffold. The electrolyte structures are considered to be solid-like (or semi-solid), because the MOF with bonded electrolyte anions is a solid structure, and only cation-solvent solvates are present inside the ion channels. There is little to no free liquid electrolyte within the ion channels. If the electrolyte structure were flooded with liquid electrolyte, it may be considered a gel electrolyte.

The electrolyte structures may be formed by spontaneously binding electrolyte anions (e.g., $ClO_4^-$, $BF_4^-$, $PF_6^-$, TFSI$^-$ (bis(trifluoromethane)sulfonimide), FSI$^-$ (bis(fluorosulfonyl)imide), etc. . . . ) to the open-metal sites of the MOF scaffolds. The binding constructs negatively charged channels in the pores of the MOF scaffold, which enable fast conduction of solvated ions (e.g., $Li^+$, $Na^+$, $Mg^{2+}$, $Zn^{2+}$).

The electrolyte structures disclosed herein possess mechanical robustness, electrochemical and chemical stability, non-flammability, and manufacture feasibility, each of which enables the fabrication of high-performance lithium, sodium, magnesium, or zinc metal batteries. The high-performance metal batteries may exhibit an increased tolerance to shock, vibration, and mechanical deformation. In particular, the lithium metal batteries may also have improved energy density (>350 Wh/kg and >750 Wh/L) and capacity retention of >80% in 100 cycles.

Two examples of the rechargeable lithium metal battery 10, 10' are shown generally in FIGS. 1A and 1B. The rechargeable batteries 10, 10' are a type of electrical battery that includes one or more electrochemical cells 12 (also illustrated in FIGS. 2 and 3), and is a type of energy accumulator used for electrochemical energy storage. In the examples shown in FIGS. 1A and 1B, the rechargeable batteries 10, 10' include one electrochemical cell 12. The rechargeable batteries 10, 10' are also known as secondary cells because the electrochemical reactions are electrically reversible. Rechargeable batteries may have many different shapes and sizes. While lithium metal batteries 10, 10' are shown in FIGS. 1A and 1B, it is be understood that the rechargeable battery 10, 10' may be other metal ion batteries, where several different combinations of chemicals may be used inside the rechargeable battery 10, 10', including, for example, sodium ion (Na-ion), magnesium ion (Mg-ion), and/or zinc ion (Zn-ion).

The rechargeable batteries 10, 10' may be useful for a variety of applications requiring rechargeable batteries 10, 10', such as, electronic devices, tools, machinery, and vehicles. As examples, the batteries 10, 10' may be suitable for electric and hybrid electric vehicles. However, it is to be appreciated that the rechargeable batteries 10, 10' may also be useful for non-automotive applications, such as, household and industrial power tools and electronic devices.

For purposes of general explanation, FIG. 2 shows a vehicle 14 including the rechargeable battery 10, 10'. The rechargeable battery 10, 10' may be useful for, for example, a plug-in hybrid electric vehicle (PHEV). Further, the rechargeable battery 10, 10' may include one electrochemical cell 12, as illustrated in FIGS. 1A and 1B, or may include a plurality of electrochemical cells 12, as illustrated in FIGS. 2 and 3. By way of example, the rechargeable battery 10, 10' may be sufficiently sized to provide a necessary voltage for powering an electric motor 16 of a hybrid electric vehicle (HEV), an electric vehicle (EV), a plug-in hybrid electric vehicle (PHEV), and the like, e.g., approximately to volts or more, depending on the required application.

Referring now to FIGS. 1A, 1B and 3, each rechargeable battery 10, 10' may have a plurality of electrodes, e.g., a positive electrode 18 or cathode and a negative electrode 20 or anode spaced opposite the positive electrode 18. With reference to FIGS. 1A and 1B, the rechargeable battery 10, 10' also includes a separator 24, disposed between the electrodes 18, 20.

For lithium-based batteries, the positive electrode 18 may be formed of $LiCoO_2$ (LCO) and the negative electrode 20 may be formed of lithium metal (Li). Other examples of suitable positive electrodes 18 include $LiNiMnCoO_2$ (NMC), lithium iron phosphate (LiFePO$_4$), lithium iron fluorophosphate (Li$_2$FePO$_4$F), an over-lithiated layer by layer cathode, spinel lithium manganese oxide (LiMn$_2$O$_4$), lithium cobalt oxide (LiCoO$_2$), LiNi$_{0.5}$Mn$_{1.5}$O$_4$, lithium nickel cobalt aluminum oxide (e.g., LiNi$_{0.8}$Co$_{0.15}$Al$_{0.05}$O$_2$ or NCA), lithium vanadium oxide (LiV$_2$O$_5$), Li$_2$MSiO$_4$ (M is composed of any ratio of Co, Fe, and/or Mn), or any other suitable material that can sufficiently undergo lithium insertion and deinsertion. Other electrodes 18, 20 may be used for sodium, magnesium, or zinc metal batteries. Suitable negative electrodes 20 for sodium, magnesium, or zinc metal batteries include, respectively, sodium metal, magnesium metal, or zinc metal. Suitable positive electrodes 18 for sodium metal batteries include NaMnO$_2$, NaFePO$_4$, and Na$_3$V$_2$(PO$_4$)$_3$; suitable positive electrodes 18 for magnesium metal batteries include TiSe$_2$, MgFePO$_4$F, MgCo$_2$O$_4$, and V$_2$O$_5$; and suitable positive electrodes 18 for zinc metal batteries include γ-MnO$_2$, ZnMn$_2$O$_4$, and ZnMnO$_2$.

In the example shown in FIG. 1A, the separator 24 is formed of an example of the electrolyte structure 26 disclosed herein. This electrolyte structure 26 is formed on the surface of the positive electrode 18. In the example shown in FIG. 1B, the separator 24 is formed of another example of the electrolyte structure 26' disclosed herein. This electrolyte structure 26' is a freestanding membrane positioned between the positive electrode 18 and the negative electrode 20. In each of these examples, the electrolyte structure 26, 26' serves as both the electrolyte and the separator 24 of the cell.

While not shown, the electrolyte structure 26, 26' may also be a hybrid separator. The hybrid separator is formed from a mixture of the MOF material, a liquid electrolyte, and a polymer binder.

The electrolyte structure 26, 26' is a shaped body including a metal organic framework (MOF) material defining a plurality of pores, and anions bound to respective metal atoms of the MOF material. The bound anions are located within each of the plurality of pores, and thus form the ionic channels of the electrolyte structure 26, 26'. Solvated cations are also present within each of the plurality of pores/ channels. The electrolyte structures 26, 26' do not include any free solvent within the pores/channels. At most, the solvent molecules that are present in the pores/channels are bound to the cations that are present within the pores/channels. When the electrolyte structure 26, 26' is a hybrid separators, the shaped body also includes the polymer binder intermingled with the MOF material.

The shaped body of the electrolyte structures 26, 26' may have any desired shape, so long as the shaped body operates to electrically separate/isolate the positive electrode 18 from the negative electrode 20, while, at the same time, allowing ion transfer between the positive electrode 18 and the negative electrode 20. As such, the shaped body of the electrolyte structures 26, 26' is electrically non-conductive and ion pervious.

Metal organic frameworks (MOFs) are a class of crystalline materials constructed from metal centers and organic of the framework of the HKUST-1. HKUST-1 includes copper atoms 28A with 1,3,5-benzenetricarboxylic acid (BTC) ligands 28B between them. As depicted, in HKUST-1, the copper atoms 28A are linked by the BTC ligands 28B. The three spheres 30A, 30B, 30C represent the various pore sizes within the framework of the unit cell 28.

Table 1 lists suitable MOF candidates that may be used as the channel scaffolds with pore size ranging from 1.1 nm to 2.9 nm, containing metal centers from the p-block (Al and In) and from the d-block (Cu, Fe, and Mn), as well as different ligands (BTC, benzene-1,4-dicarboxylic acid (BDC), isonicotinic acid (IN), and azobenzene-4,4'-dicarboxylic acid (ADC)).

TABLE 1

| MOFs | Formula | Ligand structure | Pore size |
|---|---|---|---|
| HKUST-1 | $Cu_3(BTC)_2$ | 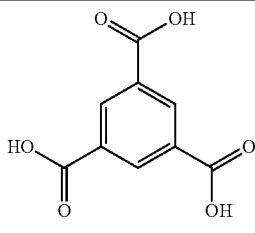<br>BTC<br>benzene-1,3,5-tricarboxylic acid | 1.1 nm |
| Mil-100-Al | $Al_3O(OH)(BTC)_2$ | | 2.9 nm |
| Mil-100-Fe | $Fe_3O(OH)(BTC)_2$ | | 2.9 nm |
| MOF-73 | $Mn_3(BDC)_3$ | 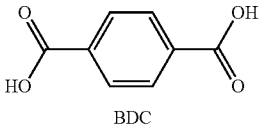<br>BDC<br>benzene-1,4-dicarboxylic acid | 1.1 nm |
| In-MOF | $(In_3O)(OH)(ADC)_2(IN)_2$ | 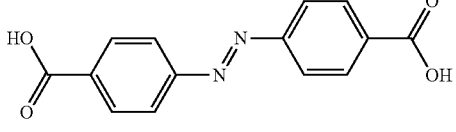<br>ADC<br>azobenzene-4,4'-dicarboxylic acid<br>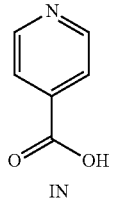<br>IN<br>isonicotinic acid | 2.3 nm | ligands, which have ordered nano-pores or nano-channels, which are capable of hosting guest species. As will be described in detail below, the pores of the MOF are large enough to accommodate the metal salt. More particularly, the pores of the MOF are large enough to accommodate the binding of anions of a metal salt to the open metal backbone of the MOF, as well as solvated cations of the metal salt, such as, lithium ions and sodium ions. An example of a suitable MOF, HKUST-1, is shown in FIG. 4A. More specifically, FIG. 4A illustrates a 2-dimensional unit cell 28

It should be appreciated that other MOF materials may also be selected, based on having suitable pore size, pore volume, metal centers, and good compatibility to the liquid electrolyte that will be used to form the ionic channels. Since the liquid electrolyte to be infiltrated into the electrolyte structures 26, 26' can be selected and modified easily, different electrolyte structures 26 and 26' can be designed to meet certain requirements of different rechargeable batteries by changing and modifying the liquid electrolyte. In an example, the electrolyte structure 26, 26' may be initially selected such that a diameter of the pores (e.g., 30A, 30B, 30C in FIG. 4A) provides a large enough size to allow molecules of the liquid electrolyte to enter, and to accommodate the anions of the salt in the liquid electrolyte. For example, the pores of the HKUST-1 material include micropores 30A, having a diameter of about 20 angstrom (A).

Further, the MOF material selection may also be based on the stability of the MOFs in the battery electrochemical environment. The judicious selection of the metal centers and organic linkers (ligands) affords the synthesis of over 20,000 MOFs with designable functionalities and pore channels. As examples, MOFs with mesopore structures may be synthesized by using a large ligand. One example of an MOF with a mesopore structure is the Meso-In-MOF. MOFs with more surface functional groups for coordinating liquid electrolytes may also be used. Other examples of suitable MOF materials include Mil-100 (such as Mil-100-Al and Mil-100-Fe in Table 1), In-meso-MOFs, and the like. It is believed that any MOF may be used in the examples disclosed herein.

Generally, MOFs are synthesized in the presence of a solvent (e.g., water) and the ligands, both of which coordinate with the MOF's metal centers. Removal of the solvent molecules (e.g., at an elevated temperature under vacuum) breaks the solvent coordination from the MOFs, resulting in MOF scaffolds with unsaturated metal centers. The conditions for solvent molecule removal may include a temperature ranging from about 200° C. to about 220° C. at a pressure of about 30 mTorr. This temperature range may be suitable for removing any solvent, although it is to be understood that high boiling point solvent may require longer evacuation times than low boiling point solvents. In an example, the powder form MOF material may be degassed or activated under vacuum at a high/elevated temperature (e.g., from about 200° C. to about 220° C.) to remove absorbed water molecules. Other solvent molecule removal methods may also be used.

The MOFs disclosed herein may be synthesized by hydrothermal or microwave methods using reported protocol(s). In an example microwave method, HKUST-1 may be synthesized using 800 watts (W) with a ramp rate of 10 degrees centigrade per minute (° C./min). After a desirable temperature is reached, the temperature may be held for a predetermined time, e.g., about 20 minutes. It should be appreciated that this method may not be suitable for forming all MOFs, and when it is suitable, the power, ramp rate, and/or time of synthesis may vary. For example, microwave methods may involve ramp rates as high as 40° C./min, hold temperatures as high as 200° C., and power settings as high as 1,450 W.

During synthesis of the MOFs, surface defects may be created. The surface defects of the MOF material are similar to pores in that they expose more unsaturated metal centers to coordinate salt anions. Therefore, the pores inside of the MOF material, as well as the defects resulting from the packing of the MOF materials, can become ion transportation channels.

The activated MOF material powder is combined with, and is soaked in, a non-aqueous liquid electrolyte composed of metal salt(s) dissolved in non-aqueous solvent(s). The non-aqueous liquid electrolyte solvent(s) may be ethylene carbonate (EC), propylene carbonate (PC), butylene carbonate (BC), dimethyl carbonate (DMC), diethyl carbonate (DEC), ethylmethyl carbonate (EMC), methylpropyl carbonate (MPC), butylmethyl carbonate (BMC), ethylpropyl carbonate (EPC), dipropyl carbonate (DPC), cyclopentanone, sulfolane, dimethyl sulfoxide, 3-methyl-1,3-oxazolidine-2-one, γ-butyrolactone, 1,2-di-ethoxymethane, tetrahydrofuran, 2-methyltetrahydrofuran, 1,3-dioxolane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, or an ionic liquid, chain ether compounds such as gamma butyrolactone, gamma valerolactone, 1,2-dimethoxyethane, and diethyl ether, cyclic ether compounds such as tetrahydrofuran, 2-methyltetrahydrofuran, 1,3-dioxolane, and dioxane, and mixtures of two or more of these solvents. The polarity of the non-aqueous solvent(s) may be selected to match the surface properties of the MOF material.

The metal salt dissolved in the liquid electrolyte solvent may be a lithium salt, a sodium salt, a magnesium salt, and/or a zinc salt. Examples of suitable lithium salts include lithium hexafluorophosphate, lithium hexafluoroarsenate, lithium bis(trifluoromethlysulfonylimide) (LiTFSI), lithium bis(trifluorosulfonylimide), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrafluoroborate, lithium perchlorate, lithium tetrachloroaluminate, lithium chloride, and combinations thereof. Examples of suitable sodium salts include sodium trifluoromethanesulfonate, $NaClO_4$, $NaPF_6$, $NaBF_4$, NaTFSI (sodium(I) Bis(trifluoromethanesulfonyl)imide), NaFSI (sodium(I) Bis(fluorosulfonyl)imide), and the like. Examples of suitable Mg salts include magnesium trifluoromethanesulfonate, $Mg(ClO_4)_2$, $Mg(PF_6)_2$, $Mg(BF_4)_2$, $Mg(TFSI)_2$ (magnesium(II) Bis(trifluoromethanesulfonyl)imide), $Mg(FSI)_2$ (magnesium(II) Bis(fluorosulfonyl)imide), and the like. Examples of suitable Zn salts include zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide), and the like. The metal salt may be selected to have a suitably sized anion, which depends, at least in part, upon the MOF material that is used. The anion size may be selected to ensure that the salt can infiltrate into at least some of the MOF pores, and then become immobilized therein to form the ionic conducting channel.

The MOF material powder may be combined with the liquid electrolyte in a weight ratio ranging from about 10:1 to about 1:10. The MOF material may be soaked in the liquid electrolyte for around one week, at room temperature. Soaking the degassed or activated MOFs in liquid electrolyte (e.g., $LiClO_4$ in propylene carbonate (PC)) allows the anions (e.g., $ClO_4$) of the metal salt to bind to the unsaturated metal sites of the MOF and spontaneously form anion-bound MOF channels. In other words, the anions are bound to metal atoms of the MOF such that the anions are positioned within the pores of the MOF. After formation, the negatively charged MOF channels are ion transport channels that allow for effective transport of the solvated cations (e.g., PC-solvated $Li^+$ or $Na^+$ or $Zn^{2+}$ or $Mg^{2+}$). The solvated cations may hop through and/or between the plurality of negatively charged MOF channels. More particularly, the solvated cations can transfer within and/or between the channels by hopping among each of the anions and/or solvents. In the pores, composed by the MOF units, the cations transfer with the help of the solvent.

When it is desirable to form the hybrid separator, the polymer binder may be mixed in with the activated MOF material powder soaking in the non-aqueous liquid electrolyte composed of metal salt(s) dissolved in non-aqueous solvent(s), as previously described. Examples of suitable binders include polyvinylidene fluoride (PVDF), polytetrafluoroethylene, and/or polyolefins, such as polyethylene (PE), polypropylene (PP), or a blend of PE and PP.

After soaking, the electrolyte structures 26, 26' may be filtered, washed, and dried in an inert environment prior to being incorporated into a metal battery. This drying step will remove most of the extra and free liquid electrolyte and leave only cation bound solvent molecules (i.e., cation-solvent solvates). It is to be understood that some of cation bound solvents may be confined within the channels by the anions. Drying, and thus liquid electrolyte removal, may be accomplished under vacuum. For this drying step, room temperature (e.g., from about 18° C. to about 25° C.) may be used.

Figure 4B:
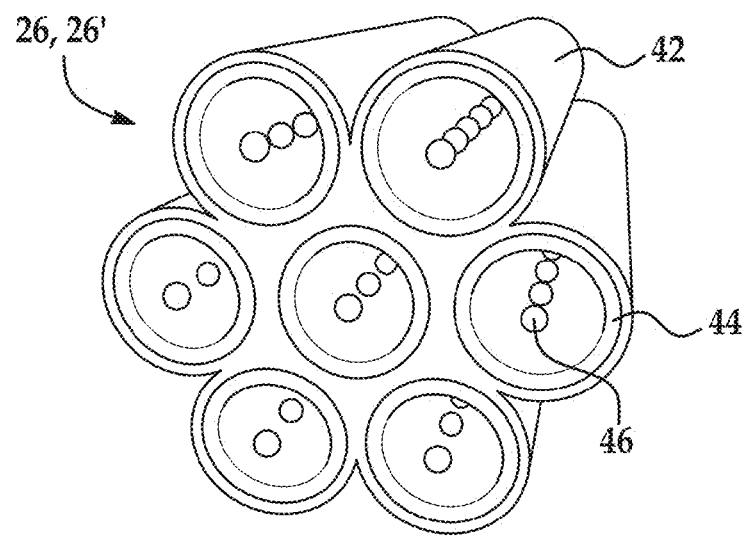
Figure 4C:
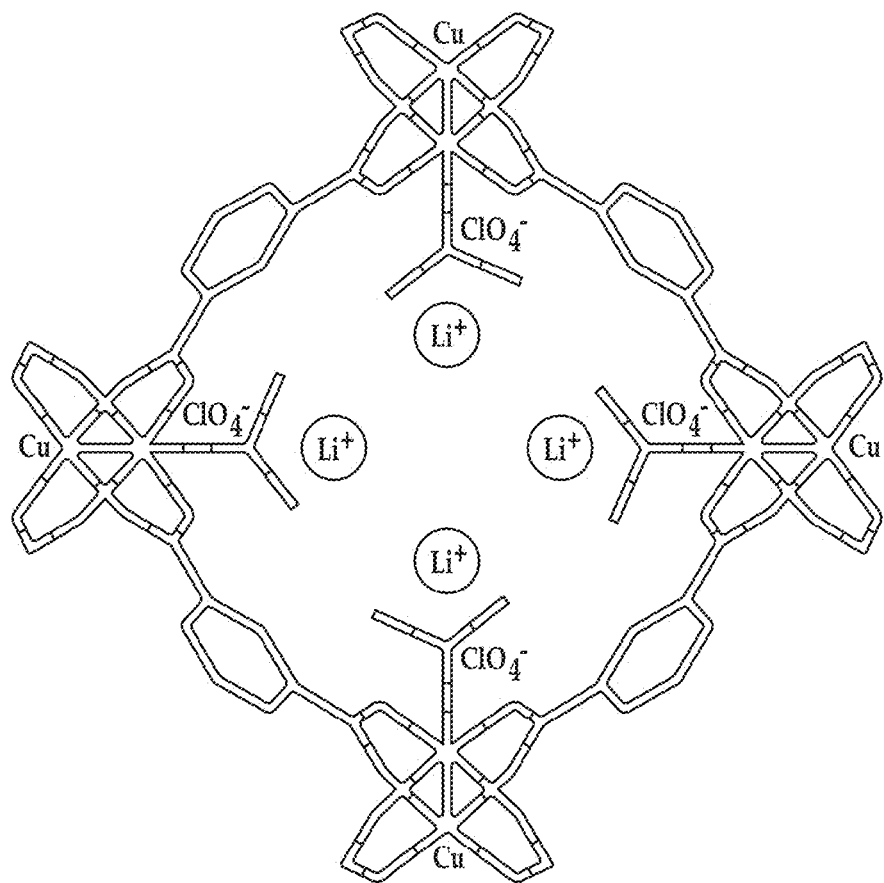

Examples of the electrolyte structures 26, 26' that are formed are shown in FIGS. 4B and 4C. FIG. 4B is a schematic, perspective view of the electrolyte structures 26, 26'. The electrolyte structures 26, 26' include the MOF framework 42, the anions bound to the metal atoms of the MOF framework 42 to form a negatively charged layer 44, and the solvated cations 46 confined within the negatively charged layer 44 by the anions. FIG. 4C is a cross view of a specific example of the electrolyte structures 26, 26'. In this example, the HKUST-1 MOF framework 44 is bound to $ClO_4^-$ anions (making up the negatively charged layer 44) via the open copper sites, and the free, solvated $Li^+$ ions are within the negatively charged layer 44 (i.e., the ionic channels).

The electrolyte structures 26, 26' may provide many advantages over traditional electrolytes, such as high ionic conductivity, Coulombic efficiency, and electrochemical stability, and mechanical robustness and fabrication ability.

Regarding the high ionic conductivity, Coulombic efficiency, and electrochemical stability, the ionic channels of the electrolyte structures 26, 26' immobilize the anions while allowing fast conduction of the cations with low activation energy (thus operational at low temperature). The incorporated liquid electrolyte is confined within these channels by the solvated cations, thereby minimizing side reactions of the liquid electrolyte with the negative electrode 20 and leading to high Coulombic efficiency and long cycling life. In addition, the robust MOF scaffolds may afford the electrochemical stability required by metal batteries.

Regarding the mechanical robustness and fabrication ability, MOFs are made from both "hard" inorganic and "soft" organic moieties, which provide sufficient hardness to prevent dendrite growth, as well as sufficient toughness to resist shock, vibration, and mechanical deformation. The synthesis of MOFs is a mature technology, and the fabrication of the MOF based electrolyte structures 26, 26' disclosed herein will be compatible with that of lithium-ion batteries.

Still further, although small amounts of the liquid electrolyte may reside within the ionic channels, the solvent molecules are bound to the cations and thus are confined within the channels, thus at least reducing the possibility of leakages. In addition to the ability to suppress Li-dendrite growth, the metal ion moieties of MOFs are excellent fire retardant agents.

The electrolyte structures 26, 26' may be formed into the shaped body (e.g., pellet). The shaped body may be prepared by pressing the dried electrolyte structures 26, 26' in a press or other similar device. In one example, the shaped body is formed using an eccentric press under an applied pressure of 10,000 pounds per square inch (psi) for a time ranging from about 10 seconds to about 60 seconds at a temperature ranging from about 25° C. to about 60° C. After the shaped body is formed, the shaped body exhibits strong mechanical performance, is ionic conducting, and is an electronic insulator. The shaped body shows no visible signs of free liquid, while maintaining lithium ion conductivity.

In one example, the electrolyte structures 26, 26' (in the form of the shaped body) has a thickness T of 15 microns (μm) or more. In other examples, the thickness T may be at least 25 microns (μm), and in still other examples, the thickness T may be at least 40 microns (μm). In some examples, the thickness is 100 μm or more. Ionic conductivity of the electrolyte structures 26, 26' may be $>10^{-3}$ S/cm ($S \cdot cm^{-1}$) at room temperature, which is significantly higher than the reported level for most solid electrolytes and is also sufficient for battery applications.

To form the rechargeable battery 10, 10', components of the electrochemical cell 12 (e.g., the positive electrode 18, separator/electrolyte structure 24, 26, or 24, 26', and negative electrode 20) may be wound together or stacked in alteration inside of a cell enclosure. Referring to FIG. 3, the electrochemical cells 12 may be formed from a heat-sealable, flexible foil 22 that is sealed to enclose at least a portion of the electrodes 18, 20 and the separator 24/electrolyte structure 26, 26'. Therefore, any number of electrochemical cells 12 may be stacked or otherwise placed adjacent to each other to form the rechargeable battery 10, 10'. While not shown in FIG. 3, it is to be understood that additional layers, such as frames and/or cooling layers, may also be positioned in the space between individual electrochemical cells 12. The actual number of electrochemical cells 12 may be expected to vary with the required voltage output of each rechargeable battery 10, 10'.

Further, although not shown, the rechargeable battery 10, 10' may generally be configured in one of four ways: (1) as a small, solid-body cylinder such as a laptop computer battery; (2) as a large, solid-body cylinder having a threaded terminal; (3) as a soft, flat pouch having flat terminals flush to a body of the device requiring power, such as a cell phone battery; and (4) as a plastic case having large terminals/current collectors in the form of aluminum and copper sheets, such as secondary electrochemical packs for automotive vehicles. In general, the rechargeable battery 10, 10' may be connected in a circuit to either discharge the rechargeable battery 10, 10', via a load (not shown) present in the circuit, or to charge the rechargeable battery 10, 10' by connecting to an external power source (not shown).

In addition, although not shown, the rechargeable battery 10, 10' may further include other components, such as, but not limited to, gaskets, seals, and terminal caps, for performance-related or other practical purposes. The rechargeable battery 10, 10' may also be connected in a combination of series and/or parallel electrical connections with other similar rechargeable batteries 10, 10' to produce a suitable voltage output and current.

During operation of the rechargeable battery 10, 10', a chemical redox reaction may transfer electrons between a region of relatively negative potential to a region of relatively positive potential to thereby cycle, i.e., charge and discharge, the rechargeable battery 10, 10' to provide voltage to power applications. In particular, a plurality of ions, such as lithium ions, may transfer between the positive electrode 18 and the negative electrode 20 during charging (C in FIGS. 1A and 1B) and discharging (D in FIGS. 1A and 1B) of the rechargeable battery 10 as set forth in more detail below.

One type of rechargeable battery 10, 10' may be a lithium-based rechargeable battery (as shown in FIGS. 1A and 1B). As used herein, the terminology "lithium-based" generally refers to secondary electrochemical devices, such as batteries and capacitors, which operate through lithium dissolution.

The rechargeable batteries 10, 10' can generate a useful electric current during discharge by way of reversible electrochemical reactions that occur when the negative electrode 20 is connected to the positive electrode 18 via a closed external circuit 40. In a lithium metal battery, an average chemical potential difference between the positive electrode 18 and the negative electrode 20 may drive electrons produced by the oxidation of lithium at the negative electrode 20 through the external circuit 40 towards the positive electrode 18. Likewise, lithium ions produced at the negative electrode 20 may be carried through the ionic channels of the electrolyte structure 26, 26', towards the positive electrode 18. Lithium ions entering the anionic channels of the electrolyte structure 26, 26' at the negative electrode 20 may recombine with electrons at an interface between the electrolyte structure 26, 26' and the positive electrode 18. Further, the electrons flowing through the external circuit 40 may reduce lithium ions migrating across the electrolyte structures 26, 26' to form inserted (e.g., intercalated) lithium at the positive electrode 18. The electric current passing through the external circuit 40 may therefore be harnessed until the inserted lithium in the negative electrode 20 is depleted, the capacity of the lithium-based rechargeable battery 10, 10' is diminished below a useful level for a particular application, or until the need for electrical energy ceases.

In addition, the lithium-based rechargeable battery 10, 10' may be charged or re-charged by applying an external power source to the rechargeable battery 10, 10' to reverse the aforementioned electrochemical reactions that occur during discharge. More specifically, the external power source may initiate an otherwise non-spontaneous oxidation of intercalated lithium at the positive electrode 18 to produce electrons and lithium ions. The electrons, which may flow back toward the negative electrode 20 through the external circuit 40, and the lithium ions, which may be carried through the ionic channels of the electrolyte structure 26, 26' and back toward the negative electrode 20 may reunite at the negative electrode 20 and replenish the negative electrode 20 with inserted lithium for consumption during a subsequent discharge cycle.

To further illustrate the present disclosure, examples are given herein. It is to be understood that these examples are provided for illustrative purposes and are not to be construed as limiting the scope of the present disclosure.

EXAMPLES

Example 1

The following examples illustrate 1) the construction of MOF-based electrolyte structures with artificial ionic channels, 2) the screening of the electrolyte structures for lithium metal batteries, and 3) the design, construction, and optimization of lithium metal batteries for targeted performance. Various MOFs were synthesized to construct the artificial ionic channels. The structure and size of the channels, MOFs composition, and integration of the electrolytes into lithium metal batteries were systematically investigated and optimized.

Section 1: Construction of MOFs-Based Artificial Ionic Channels

Over 20,000 MOF phases with variant metals, ligands, pore sizes, and topologies have been synthesized. In the examples disclosed herein, the MOFs should exhibit high ionic conductivity. It is hypothesized that the ionic conductivity will be governed by the following: the binding ability of the anions to the open-metal sites; sufficiently large pores to accommodate the solvated ions; and suitable ligands that can aid in lithium ion-dissociation.

The ionic channels in biological systems function while maintaining a negatively-charged environment within the channels. Fundamentally, this could be achieved by maintaining a channel radius less than the Debye length of the liquid media. Debye length is the measure of a charge carrier's net electrostatic effect in solution, described in terms of the distance the electrostatic effect persists. The liquid electrolyte of propylene carbonate (PC) containing 1M $LiClO_4$, for example, has an estimated Debye length of 1.85 nm at 298 K calculated using a dielectric constant of 64.9 for PC. $LiClO_4$ in PC typically has an ionic radius of 0.36 nm, suggesting that the required channel diameters would be between 0.4 nm to 3.7 nm (two times the Debye length) when 1M of $LiClO_4$ in PC is used as the liquid electrolyte. For these examples, $LiClO_4$ in PC will be used as the model liquid electrolyte due to its high ionic conductivity and ability to bind with the open-metal sites. Since most MOFs possess pore sizes within the range given above, the focus in these examples was on the metal centers and the ligands used to construct the MOFs.

Synthesis of MOF-Based Artificial Ionic Channels

Table 1 provided herein lists the MOF candidates that were used as the channel scaffolds. These MOFs were synthesized by hydrothermal or microwave methods using the reported protocol. As-synthesized MOFs were confirmed using x-ray diffraction (XRD). The as-synthesized MOFs were also activated at elevated temperatures under vacuum to remove the complex solvent molecules and to generate open metal sites. Thermogravimetric analysis (TGA) can be used to determine the outgassing temperature; and XRD was used to ensure the retention of the MOFs crystalline structure after outgassing. The activated MOFs were soaked in a PC—$LiClO_4$ solution to allow binding of the $ClO_4^-$ ions to the open metal sites of the MOF. Solutions with different $LiClO_4$ concentrations were soaked and different soaking times were tested. The soaked MOFs were filtrated, washed with PC, and dried in $N_2$ or Ar environment for further use.

FIG. 5A shows XRD of the as-synthesized HKUST-1, one of the most characterized MOFs, as well as the XRD after degassing and soaking with 1M $LiClO_4$. The crystalline structure was maintained throughout the procedure. It was noted that the peak at 2θ 8.31° appeared after the degassing and disappeared after the soaking process. This was consistent with removal of the guest water molecules that create unsaturated copper centers, as well as the subsequent coordination with the $ClO_4^-$ ions. FIG. 5B shows a scanning electron micrograph (SEM) of the as-synthesized HKUST-1, suggesting uniform particles around 100 nm. The inset in FIG. 5B shows black and white photographs of the pristine MOF (1, originally light blue in color due to the copper coordination with water), degassed MOF (2, originally dark blue to purple signifying the emergence of unsaturated copper centers), and the soaked MOF (3, originally deeper blue representative of the $ClO_4^-$ binding).

The composition of the soaked MOFs was measured by a weighting method. Briefly, pellets of activated MOFs were prepared, the mass of the pellets, soaked pellets, and soaked pellets after evacuation of the PC (at room temperature to avoid the decomposition of $LiClO_4$) were respectively measured. The composition of the soaked pellets were then readily calculated. Using this method, it was found that the soaked HKUST-1 consisted of 53% MOF, 24% PC, and 23% $LiClO_4$. Accordingly, the molecular formula of the HKUST-1 conductor was determined to be $Cu_3(BTC)_2(LiClO_4)_2 \cdot 4PC)_{2.7}$. Considering structural defects of the MOF and incomplete removal of the PC (at room temperature), it was expected that the formula was close to $Cu_3(BTC)_2(LiClO_4)_3(PC)_3$, signifying a 1:1 stoichiometric ratio between the Cu, $LiClO_4$ and PC. This was consistent with the hypothesis that $ClO_4^-$ ions will bind to the open metal sites. Furthermore, this formula suggests that PC and $Li^+$ form a one to one network, facilitating their possible conduction within the channels in a manner similar to the proton transport in water through the Grotthuss mechanism.

Ionic Conductivity Measurement

Ionic conductivity of the MOFs was measured using electrochemical impedance spectroscopy (EIS). MOFs were pressed into dense pellets using 30 MPa pressure at room temperature. The pellets were then be placed between 2 stainless steel blocking electrodes (10 mm in diameter) and assembled within 2032-type coin cells. The data was fitted (using the end-points of the semicircle) to the ionic resistivity based on the equivalent RC circuit model. Conductivity was also measured at different temperatures to calculate the activation energy.

Figure 7A:
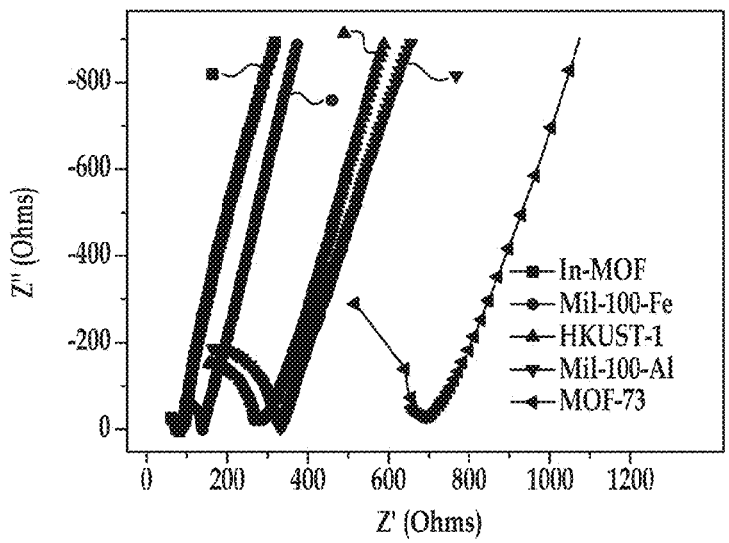
FIGS. 7A through 7C respectively illustrate (A) electrochemical impedance spectroscopy (EIS) plots, (B) Arrhenius plots, and (C) their comparison with current-state-of-the-art solid electrolytes.
Figure 7B:
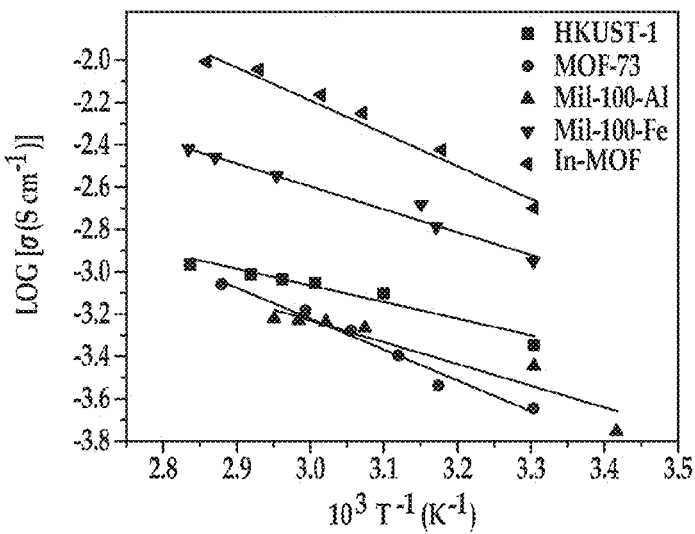

FIG. 6 shows a black and white photograph of a pellet of HKUST-1 electrolyte structure, as well as the SEM image showing a uniform surface. Other MOFs (Mil-100-Al, Mil-100-Fe, In-MOF, and MOF-73) were synthesized and the ionic conductivity was measured. The In-MOF and Mil-100-Fe have conductivities reaching $10^{-3}$ S/cm, which is the same magnitude as commercial gel electrolytes. The ambient impedance spectra (FIG. 7A and Arrhenius plots (FIG. 7B), plus the conductivities and the activation energies (Table 2) were also obtained.

TABLE 2

| MOF | Ionic Conductivity (S/cm) | Electronic Conductivity (S/cm) | Activation Energy (eV) |
| --- | --- | --- | --- |
| In-MOF | $2.02*10^{-3}$ | $1.78*10^{-9}$ | 0.15 |
| HKUST-1 | $4.49*10^{-4}$ | $1.12*10^{-7}$ | 0.12 |
| MOF-73 | $2.27*10^{-4}$ | $1.19*10^{-7}$ | 0.16 |
| Mil-100-Fe | $1.13*10^{-3}$ | $8.59*10^{-6}$ | 0.15 |
| Mil-100-Al | $3.58*10^{-4}$ | $3.37*10^{-7}$ | 0.13 |

Figure 7C:
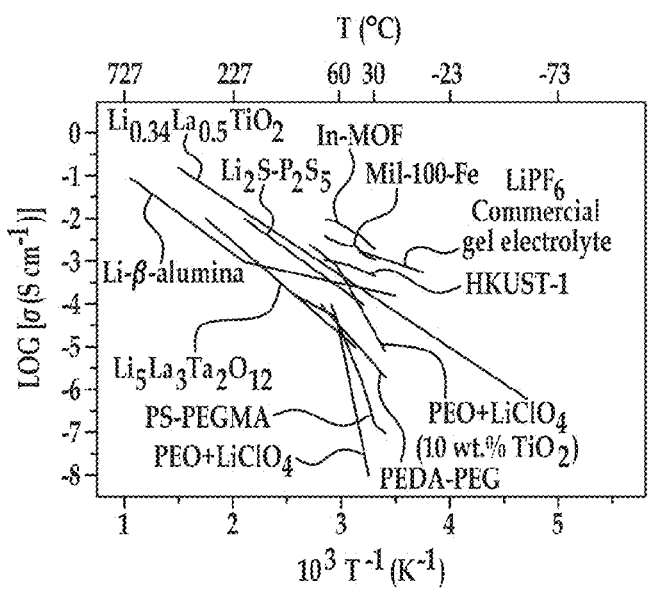

As depicted in Table 2, the activation energies (Ea) were low and comparable to liquid electrolytes (e.g., for 1M $LiPF_6$-EC:EMC, the Ea is around 0.147 eV from 20 to 65° C.). FIG. 7C further compares the ionic conductivity of HKUST-1, In-MOF, and Mil-100-Fe with other highly researched electrolytes. The MOF electrolyte structures had conductivities surpassing most polymeric electrolytes (e.g., PS-PEGMA, PEDMA-PEG, PEO, and PEO with $TiO_2$ additive) and most ceramic electrolytes (such as LLT phase $Li_{0.34}La_{0.5}TiO_2$, garnet phase $Li_5La_3Ta_2O_{12}$, and glass phase $Li_2S$—$P_2S_5$). This preliminary data indicates the outstanding feasibility of constructing effective artificial ionic channels from MOFs.

Understanding the Molecular Origin of the Artificial Ionic Channels

To understand and better design the artificial ionic channels, spectroscopic studies were conducted. For example, Raman spectroscopy was used to probe the ion-solvent, solvent-framework, and ion-framework interactions. Raman spectra were collected with a laser wavelength of 514 nm and a 20 second exposure time. The nominal laser power will set to 1% for one accumulation. PC-soaked MOF, MOF soaked in $LiClO_4$—PC solution, and the PC—$LiClO_4$-soaked MOF followed by PC evacuation, were examined. Particular attention was paid to the interactions between the $ClO_4^-$ anions and the copper centers. The interactions of solvated $LiClO_4$ ion pairs in bulk electrolyte (~939 $cm^{-1}$) were compared with those confined within the MOF channels. A weakening peak at 939 $cm^{-1}$ was expected to be accompanied by a solvated $Li^+$ ion peak (~902 $cm^{-1}$).

FIG. 8A shows the Raman spectra of HKUST-1 soaked with PC, HKUST-1 soaked with 1M $LiClO_4$ in PC, HKUST-1 soaked with 1M $LiClO_4$ in PC followed by PC evacuation by vacuum, and $Cu(ClO_4)_2$. After soaking with 1M $LiClO_4$, the Cu—Cu stretch from the HKUST-1 at 147 $cm^{-1}$ shifted downward and increased in intensity in the presence of $LiClO_4$, accompanied by a new peak at 240 $cm^{-1}$ indicating bindings between the open copper sites and the $ClO_4^-$ ions. After PC evacuation, besides the $Cu(ClO_4)_2$ peaks, a new peak at 302 $cm^{-1}$ emerged in the soaked sample, which served as additional evidence of Cu—$ClO_4$ binding. From FIG. 8B, emergence of the $Li^+$—PC peak around 900 $cm^{-1}$ for the $LiClO_4$—PC-soaked sample confirmed the formation of solvated $Li^+$. In the vacuumed sample, a weakened peak at 939 $cm^{-1}$ served as evidence of the formation of contact-ion pairs due to removal of the PC, compared to the non-vacuumed sample. It was noted that the vacuumed sample still exhibited a $Li^+$—PC peak around 900 $cm^{-1}$, which was due to the incomplete removal of the PC which are bound with cations within the channels. From these Raman studies, it can be concluded that the origin of charge separation and ion-channel formation in the MOFs channels are directly connected to the binding of the metal sites with the $ClO_4^-$ ions, as well as the retention of PC within the channels that solvate the $Li^+$ ions.

Section 2: Screening the Electrolyte Structures for Lithium Metal Batteries

The goal was to screen suitable MOFs for lithium metal batteries from the candidates identified above. The MOF electrolyte structures can be made using three different methods and examined for ionic conductivity, electrochemical and chemical stability, and mechanical robustness. For the successful operation of batteries, there is typically a minimum requirement of the ionic conductivity on the order of $10^{-4}$ S $cm^{-1}$. Li-ion conductors with conductivity above this level can be considered for the lithium metal batteries.

Fabrication of Shaped Bodies from the MOF Electrolyte Structures

Pellet-Pressing Method.

A pressing method similar to that described above (under Ionic conductivity measurement) may be used to form freestanding electrolyte films from the MOF electrolyte structures. The thickness of such films is typically above 100 um to maintain mechanical integrity. For electrolyte application, thinner films may be desired. Nevertheless, such electrolyte films are prepared without adding other additives, making them ideal for electrochemical stability and flammability tests.

Slurry-Coating Method.

A slurry coating method was developed to prepare the electrolyte films. MOFs and binders, such as polyvinylidene fluoride (PVDF) can be mixed in suitable solvent to form the slurries, which are coated on cathodes (e.g., lithium cobalt oxide or LCO) (see FIG. 1A). A subsequent pressing procedure is applied to ensure favorable interfacial affinity and minimum resistance. After degassing, the coated cathodes are soaked in the electrolyte to construct the artificial ionic channels. From a manufacture perspective, this technique is compatible with the conventional electrode preparation processes. Different slurry compositions, pressing pressure, and activation conditions may be optimized.

For this method, cathodes were firstly prepared by coating the slurry containing lithium cobalt oxide (LCO), carbon black, PVDF and In-MOF (6:2:1:1 in weight) onto an alumina current collector. Then, 10 wt % MOF was also added to provide continuous Li$^+$ conductive pathways within the cathodes. A slurry of In-MOF and PVDF (9.25: 7.5 in weight) was then coated onto the dried cathodes. After drying and pressing with 30 MPa pressure, the electrodes were soaked in 1M LiClO$_4$ in PC, resulting in the formation of LCO cathodes coated with a layer of orange-color In-MOF electrolyte (see FIG. 9A). In the top-down SEM images, the pressed thin film exhibited smooth morphology (FIG. 9C) in contrast with the rough and porous surface of the uncompressed film (FIG. 9B). The cross-sectional SEM (FIG. 9D) showed the composite cathode containing a LCO/MOF layer with 30-40 um thick.

Composite Method.

To further implicate the electrolyte structures for device applications, freestanding, mechanically robust composite films of the electrolyte structures can be developed. These composite films can be used as both the solid-like electrolyte and the separator in battery fabrication (see FIG. 1B). This is achieved by mixing the MOFs with binders, such as PVDF or polytetrafluoroethylene (PTFE), to form the composite powders. The composite powders are then pressed at elevated temperature (e.g., 250° C.) to form flexible yet robust membranes. These membranes are degassed and the artificial ionic channels are formed after soaking in the liquid electrolyte. Different slurry composition, pressing pressure, temperature, and activation conditions may be used to achieve the optimized performance.

For this method, In-MOF was mixed with PTFE at 95:5 (mass ratio) and pressed at 30 MPa and room temperature to form a freestanding composite film. After degassing and electrolyte (in 1M LiClO$_4$ in PC) soaking, flexible films of the composite electrolyte was obtained (FIG. 10A). Successful fabrication of dense MOF-PTFE freestanding films was also completed. FIG. 10B shows the cross-sectional SEM image of the pressed composite film, explicitly showing the formation of aligned PTFE fibers that firmly glue the MOF particles into a robust structure. No large sub-micropores can be observed. The corresponding film thickness was around 70-80 um, which was reduced to 40-50 um for device application.

Evaluation of the MOF Electrolyte Structures for Lithium Metal Batteries

Electrochemical Stability.

MOFs with artificial ion-channels were pressed into pellets using the procedure described under Ionic conductivity measurement. The pellets were sandwiched between a Li-metal disc and an Al-metal disc, and assembled into coin cells for anodic stability measurement. By changing the Al-metal disc into Cu-metal foil, cathodic stability of the electrolytes could also be evaluated. The electrochemical stability window of the electrolyte structures was tested by linear sweep voltammetry (LSV). The low potential limit should have been slightly below 0 V (vs. Li$^+$/Li) to confirm reversible deposition/dissolution of Li, as well as the absence of any decomposing peaks from the MOFs scaffolds. Decomposing peaks at high potential, which might originate from either MOFs or the species in the ion-channels, can also be measured to determine the stability window.

Figure 11B:
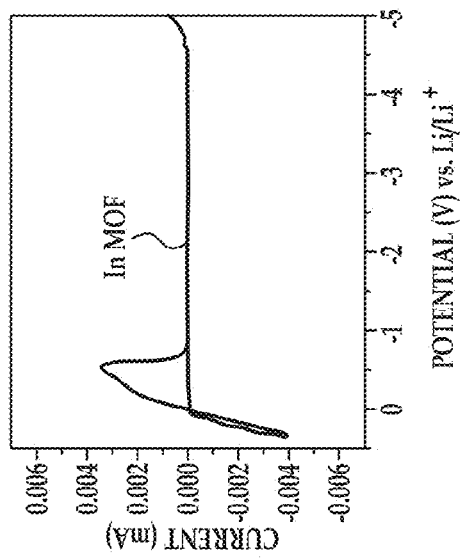

Several MOFs candidates for electrolyte structures were evaluated. FIG. 11A shows the linear sweep voltammetry (LSV) of these candidates up to 5.0 V (to check anodic stability), indicating that In-MOF (see the inset of FIG. 11A) has the largest stability window. LSV was then used to further examine the stability of the In-MOF electrolyte to −0.5 V (to check cathodic stability and reversibility of Li plating/stripping) (FIG. 11B). Lithium dissolution and deposition peaks were observed at low potential, and notable current was not observed until 4.7 V, confirming that In-MOF has a large, stable voltage window.

Figure 11C:
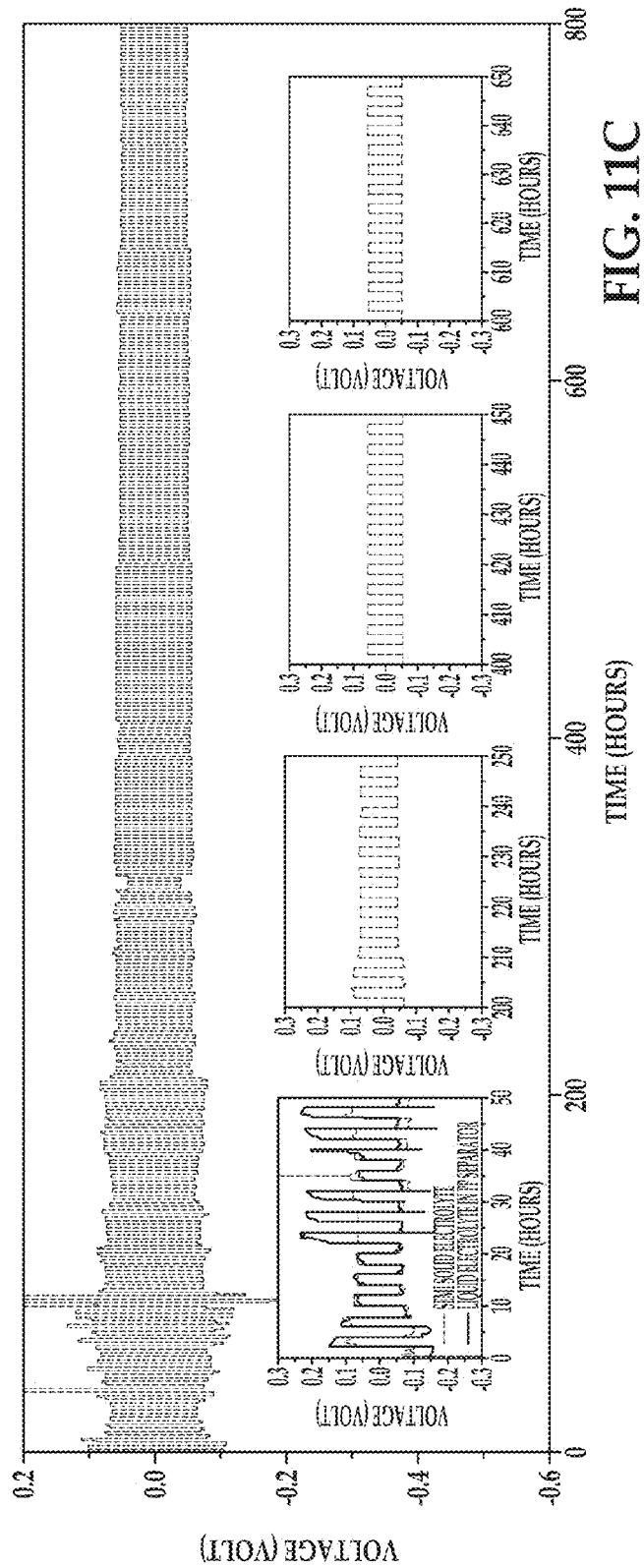

Symmetric Li/MOFs/Li coin cells were assembled by sandwiching the pellets of the electrolyte structures between two Li-metal discs. To investigate the interfacial stability and compatibility between Li and MOF membrane, Li stripping and plating experiments were conducted with the symmetric cell. The test was performed at a current density of 0.13 mA cm$^{-2}$. As shown in FIG. 11AC, the MOF electrolyte exhibits regular stepwise voltage curves during galvanostatic polarization with the exception of the activation process at the beginning of the cycles. Furthermore, the stable operation up to 800 hours suggests the exceptional interfacial stability and superior dendrite blocking capability. In comparison, a Li/commercial separator/Li coin cell infused with same amount of liquid electrolyte (propylene carbonate (PC) containing 1M LiClO$_4$) shows the irreversible and irregular curves (far left graph in the inset of FIG. 11C), which could be ascribed to the notorious SEI (solid electrolyte interphase) properties from neat propylene carbonate (PC) and ion relaxation process in binary-ion conducting system, respectively. More importantly, Li/commercial separator/Li coin cell failure was observed from short circuit within 20 hours.

The cells after cycling can be disassembled for further characterizations by SEM, AFM, and other tools. Mechanical robustness was mainly examined by observing cracking that may exist during the processing. Other quantified measurements (e.g., modulus, toughness, and deformation) can be conducted.

Structure and Composition Evolution.

Cells can be disassembled after cycling or other tests, and the structure and composition of the electrolyte structures can be examined using SEM, XRD, XPS, FTIR and other techniques. Particular attention may be paid to the Li-metal surface, where SEI is commonly formed. The composition of the SEI layers may be extensively studied to help understand and evaluate the electrolyte stability against the Li metal. Such systematic studies are likely to contribute to further understanding of the structure and composition evolution of the Li-metal anodes and the electrolytes.

Flammability and Temperature Dependency.

Ionic conductivity can be evaluated at different temperatures, which may serve as an indication of the performance at different operational temperatures. The temperature range where the solid electrolytes normally operate may be studied and compared with those of liquid and other solid electrolytes. Differential scanning calorimetry (DSC) can be used to determine the boiling and melting temperatures of the solvent within the channels. Due to the confinement effect, a higher boiling point and a lower melting point, when compared with the bulk electrolyte counterparts, are expected. This study is likely to provide insights on the conductivity at different temperatures. Significantly improved conductivity at low temperature is also expected, which will be consistent with the low activation energy measured (FIG. 7C).

Figure 12A:
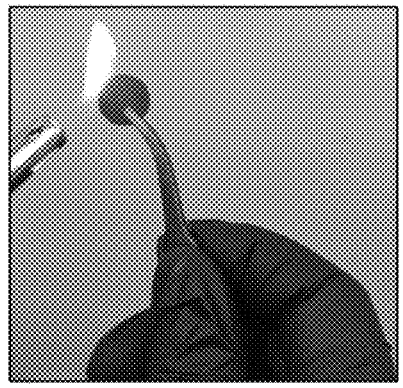
FIGS. 12A through 12C are photographs of flammability tests of (A, B) In-MOF and (C) a commercial separator with $LiClO_4$ in PC.
Figure 12B:
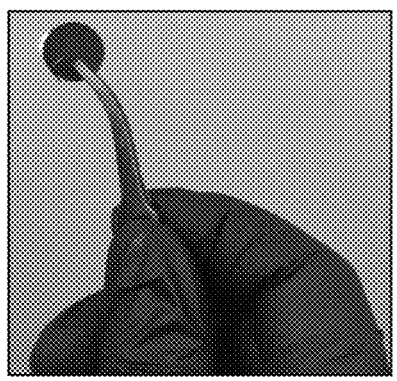
Figure 12C:
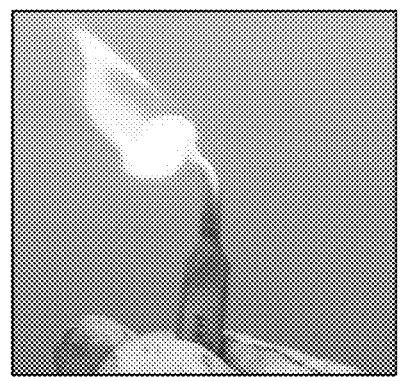

Flammability tests can be conducted by contacting the electrolyte pellets with a flame to observe their flammability. A flammability test of the In-MOF electrolyte structure was performed by contacting a pellet with a flame (FIG. 12A). Some minor cracking was observed afterwards for the In-MOF electrolyte pellet (FIG. 12B). In sharp contrast, the commercial separator with a liquid electrolyte immediately caught on fire upon contact with flame (FIG. 12C). These results prove that the stability of the MOFs electrolyte structures with high ionic conductivity, the large and stable voltage window, the outstanding electrochemical stability, and the non-flammability can be developed.

Optimization of the MOF Electrolyte Structures for Lithium Metal Batteries

Pore Structure.

Figure 13:
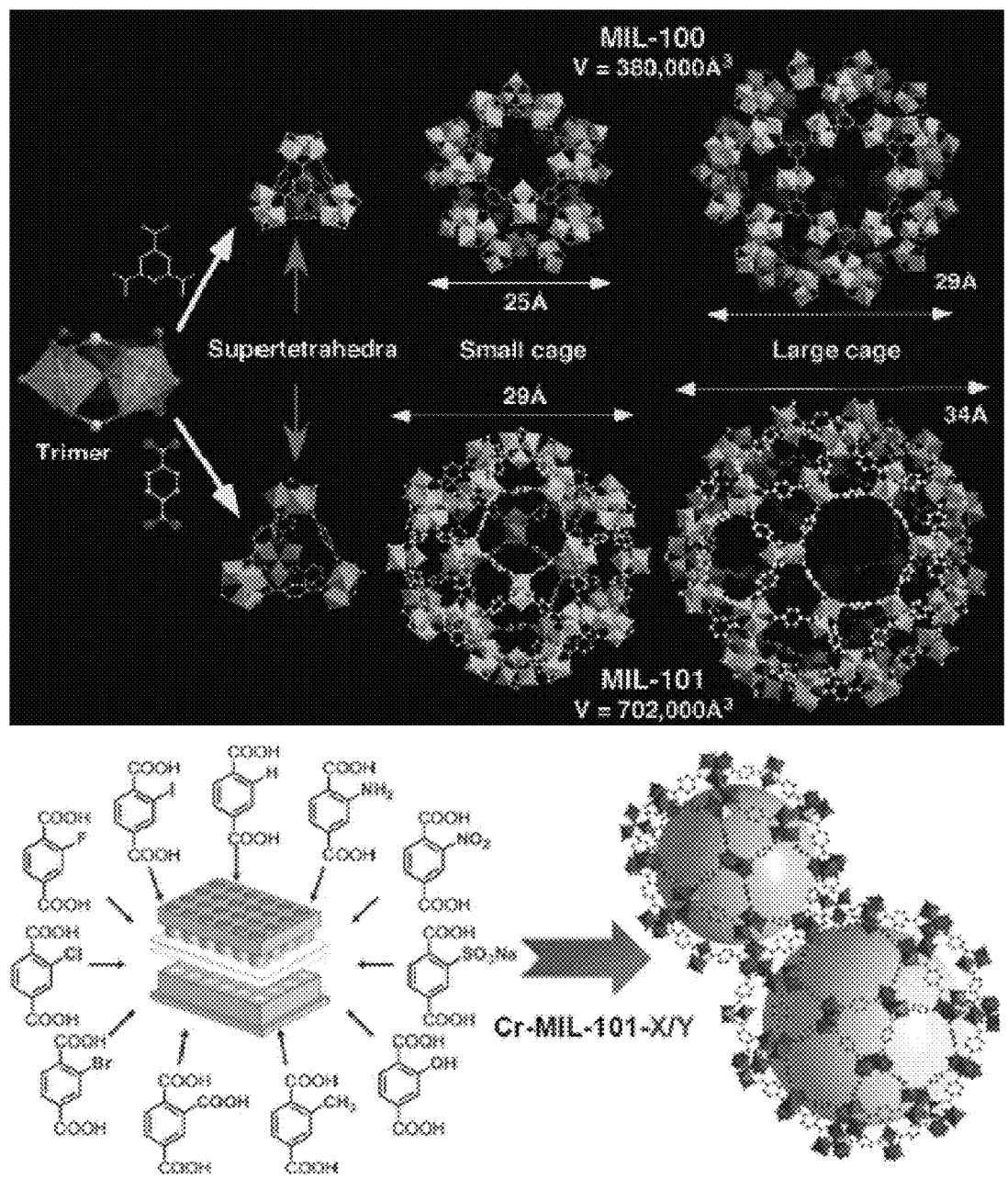
FIG. 13 depicts, at the top, a comparison of Mil-100-Cr and Mil-101-Cr, which suggests the use of benzene-1,4-dicarboxylic acid (BDC) in Mil-101-Cr to allow for larger pore sizes and apertures than in Mil-100-Cr, and depicts, at the bottom, Mil-101-Cr modified with different R-groups affording different functionality without altering the pore size and shape.

It may be desirable to optimize the MOF electrolyte structures with targeted ionic conductivity and mechanical modulus. To improve the ionic conductivity, different synthesis methods (e.g., microwave synthesis) may be used to gain MOFs with different size, morphology, and crystallinity. With respect to pore size, there is a vast database of isostructural series, and small constituents may be tuned within the MOFs to gain different pore size or shape without changing the structural topology. An example of this is shown in FIG. 13 with Mil-100-Cr and Mil-101-Cr. In both structures, the chemical constituents (C, H, O, and Cr) are exactly the same, but with a different pore size and shape. Mil-101-Cr has larger pore apertures than Mil-100-Cr due to the use of BDC instead of BTC. The larger pore sizes may allow for higher ion-uptake and conductivity.

Chemical Composition.

MOFs with metal centers that show high electrochemical stability may be particularly suitable for the electrolyte structures. Ligands with different functional groups may be tuned to change the chemical environment of the pores, while maintaining a similar physical environment. As shown in FIG. 13, this can be represented by a Mil-101-Cr isostructural series. In this case, the pore size and molecular order are the same in each structure while the terminal R group on the BDC ligand is altered. Here, Mil-101-Cr can have its pore environment modified to have decorated amine, urea, halogen, and other chemical groups with differing MOF-electrolyte interaction.

Lithium Salt and Solvent.

Different lithium salts and solvents may be used to examine their compatibility with the MOF electrolyte structures and their possible effects on the stability/conductivity. The stability of these electrolytes will be systematically tested and optimized. Other approaches, such as adding additives for Li metal protection, creating protective layers on Li metal anodes, and adding protective layers on the MOFs films will also be considered.

Section 3: Design, Fabrication and Evaluation of Lithium Metal Batteries Based on MOF Electrolyte Structures Based on the MOF electrolyte structures developed in previous sections, prototype full cells of lithium metal batteries with high energy density, long lifespan, and improved safety will be developed with the following targets: volumetric energy density>750 Wh/L, capacity retention>80% after 100 cycles, and improved abuse tolerance performance. Three steps are proposed to accomplish these goals: 1) feasibility demonstration of LMBs by coin-cell studies; 2) scaling the coil cells to single-layer pouch cells with optimized energy density and capacity retention; and 3) fabricating prototype multi-layer pouch cells (1 Ah capacity) meeting these targets.

Coin Cell Design, Fabrication, and Evaluation

Coin cells can be fabricated using selected cathode materials, MOF electrolytes, and Li-metal anodes, and subjected to systematic electrochemical evaluations. Commercially available cathodes with good performance, including $LiFePO_4$, $LiCoO_2$ and $LiNi_{1-x-y}Mn_xCo_yO_2$, may be used. Other cathode materials, e.g., sulfur may also be used, providing a non-carbonate solvent can be used to construct the ion-channels. As shown in FIGS. 1A and 1B, coin cells may be made by sandwiching the electrolyte structures between a Li metal disc and a conventional cathode, or by directly assembling a Li-metal disc with an electrolyte-coated cathode. To minimize the interface resistance, various amounts of MOF electrolytes will be incorporated into the cathodes.

The coin cells may be subjected to systematic electrochemical evaluations. Galvanostatic charge/discharge measurements may be applied at a constant current rate (e.g., 0.1 C) for at least 100 cycles. The retained capacity and Coulombic efficiency may be collected to evaluate the cycling stability. Rate capability may be evaluated at various current rates (e.g., 0.2, 0.5, 1 and 2 C) to examine the electrochemical kinetics. EIS may be used to analyze the change of impedance during the cycling, which will provide insights for the cycling stability. Other electrochemical techniques, such as CV and galvanostatic intermittent titration technique (GITT) may also be applied to study the properties related to lithium-ion diffusion. These types of tests provide valuable design parameters toward the design of pouch cells. After the cycling test, the coin cell may be disassembled to characterize the structural or compositional change during the cycling.

In-MOF electrolyte structures were coated on LCO cathodes (as described herein) and assembled with Li-metal discs into a lithium-metal battery. As shown in FIGS. 14A and 14B, galvanostatic charge (C)/discharge (D) tests at a current density of 0.05 C between 3.2 and 4.2V provide well-profiled charge/discharge curves, indicating that the MOF electrolyte structures are fairly stable against highly oxidative or reductive stress during the cycling. The estimated specific capacity was approaching the theoretical capacity of LCO (140 mAh $g^{-1}$). Post-cycle EIS analysis was also conducted after 20 cycles to elucidate the impedance evolution (FIG. 14C). Both Nyquist plots of the fresh and post-cycle cell exhibit one semicircle followed by one slope line. The first intercept with the real axis could be explained as bulk electrolyte resistance, and the subsequent semicircle can be interpreted as the overlapping of MOF-Li, MOF-LCO interface resistance and charge transfer resistance. The reduced semicircle diameter suggests ameliorative resistance after cycling, which might be caused by the improved interphase contact after cycling. However, polarization of the cell, as well as gradual capacity decay, was still observed, and this may arise from the poor interfacial contact and/or insufficient ionic conductivity. These results clearly demonstrate the feasibility of making lithium metal batteries using the MOF electrolyte structures.

Figure 15:
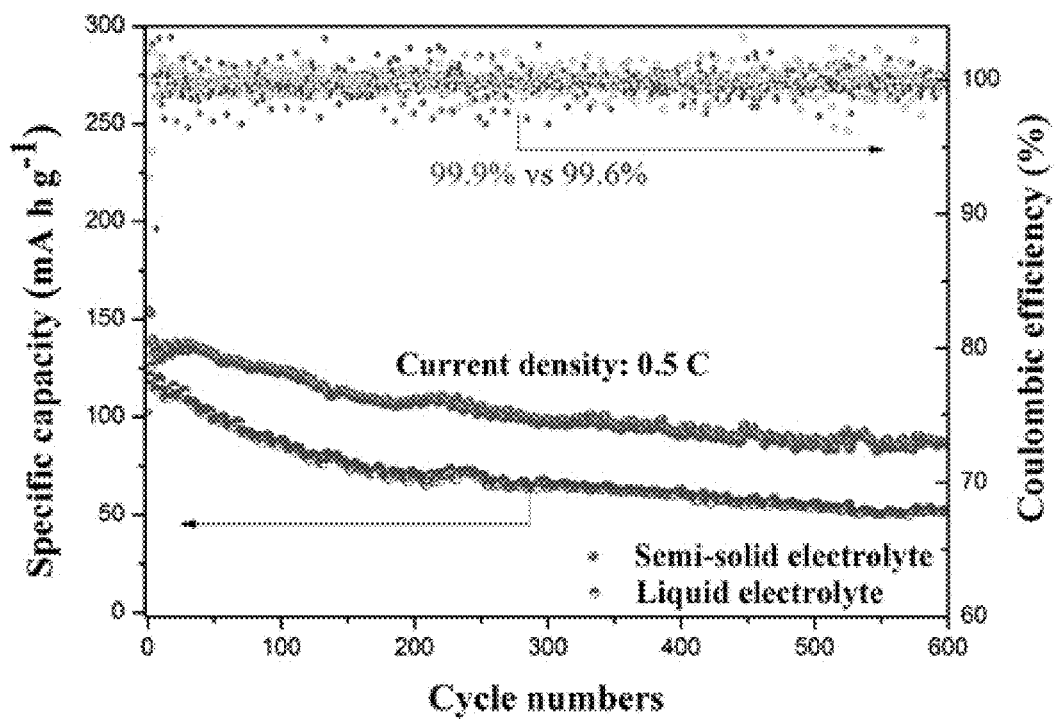
FIG. 15 is a graph depicting the long-term cycling performance comparison (in terms of specific capacity (mAh $g^{-1}$) versus cycle number and Coulombic efficiency versus cycle number) of a $LiFePO_4$ (LFP)—Li cell formed with a composite In-MOF semi-solid electrolyte or with a commercial separator and a liquid electrolyte.

$LiFePO_4$|MOF-based electrolyte|Li cells were fabricated to evaluate the cycle performance. A comparative cell was formed of $LiFeP_4$|polypropylene separator |Li, and a liquid electrolyte (propylene carbonate (PC) containing 1M $LiClO_4$). The current density for both cells was 0.2 C for the first 5 cycles, and 0.5 C for the remainder of the cycles. As shown in FIG. 15, for the MOF-based electrolyte cell (labeled semi-solid electrolyte, data shown in red), the initial Coulombic efficiency was 93% and the capacity retention was 70% for over 600 charge/discharge cycles, which corresponds to 0.052% fading per cycle. In contrast, the first Coulombic efficiency for the comparative cell (labeled liquid electrolyte, data shown in blue) was only 75% and the deliverable specific capacity at 600 cycles was only 45% of first cycle. Notably, the average Coulombic efficiency at 0.5 C for the comparative example was 99.6% compared with over 99.9% for the cell including the MOF-based electrolyte. The remarkable Coulombic efficiency and stable cycle life of the cell with the MOF-based electrolyte at moderate rate (0.5 C) undoubtedly indicates the superb electrochemical stability and capability to reduce side reactions. The overall evidence support the fact that the negatively charged MOF pore channels enable efficient Li$^+$ transport pathways and reduce polarization loss.

Figure 16A:
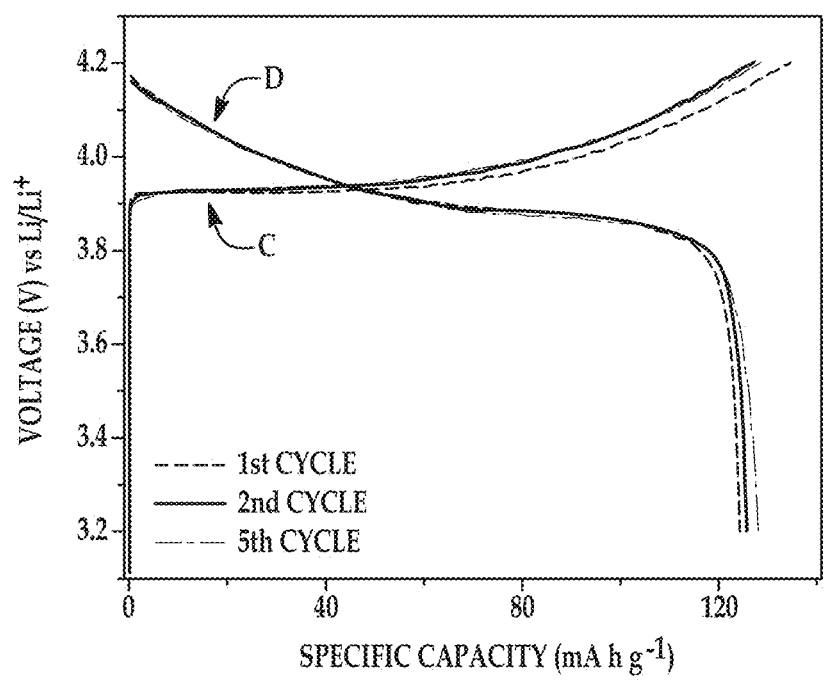
FIGS. 16A and 16B are graphs depicting the cycle performance of LCO-Li lithium metal batteries made using pressed In-MOF-PTFE membrane as the electrolyte.
Figure 16B:
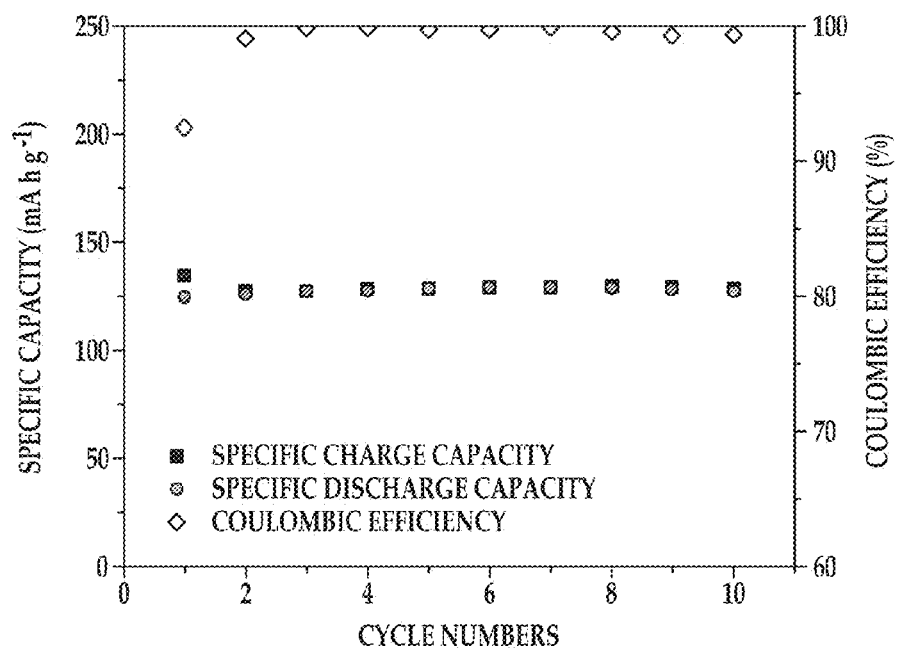

To improve the interfacial contact between the cathode and the MOF electrolyte structure, the In-MOF composite films were pressed onto an LCO cathode using 30 MPa pressure (see, e.g., FIG. 1A). The films and cathode were assembled into a coin cell with a Li-metal anode. FIGS. 16A and 16B show the results of this cell at a current density of 0.1 C. In particular, FIG. 16A shows galvanostatic charge (C)/discharge (D) profiles (in terms of voltage (V) vs Li/Li$^+$ versus specific capacity (mAh g$^{-1}$)) for different cycles of the cell, and FIG. 16B shows the specific capacities and Coulombic efficiency of the cell. The pressed In-MOF composite films/cathode resulted in significantly improved performance as follows: 1) well-defined observed plateau in FIG. 16A indicates minor polarization and significantly enhanced energy efficiency compared with slurry casting prepared batteries; 2) high initial charge and discharge capacity of 134.4 and 124.3 mAh g$^{-1}$, respectively, were obtained and correspond to a high Coulombic efficiency of 93% (FIG. 16B); 3) reversible specific capacity of −128 mAh g$^{-1}$ at a current rate of 0.1 C was delivered, which is approximately 92% of the theoretical capacity of LCO (140 mAh g$^{-1}$ at 3.2-4.2V); and 4) high Coulombic efficiency approaching 100% and almost no capacity fading are observed in the initial 10 cycles.

These results strongly support the feasibility to use the MOF electrolyte structures for lithium metal batteries. It is believed that favorable interfacial contact between active materials and ionic conductors may be important for relieving polarization and improving cycling performance. Various strategies, including high-pressure pressing or the introduction of an extra buffer layer may be used to improve the interfacial contact.

Pouch Cell Fabrication

Design of Low-Cost Cells with High Performance.

Based on the lithium metal battery's targeted energy density, specific cell design parameters were studied using a proprietary design tool. LiCoO$_2$ (LCO) and LiNi$_{1-x-y}$Mn$_x$Co$_y$O$_2$ (NMC) were the primary cathode materials based on their stable electrochemical performance (<4.2 V vs. Li/Li$^+$), relatively high specific capacity, and high specific density (>4.75 g/cc).

Figure 17:
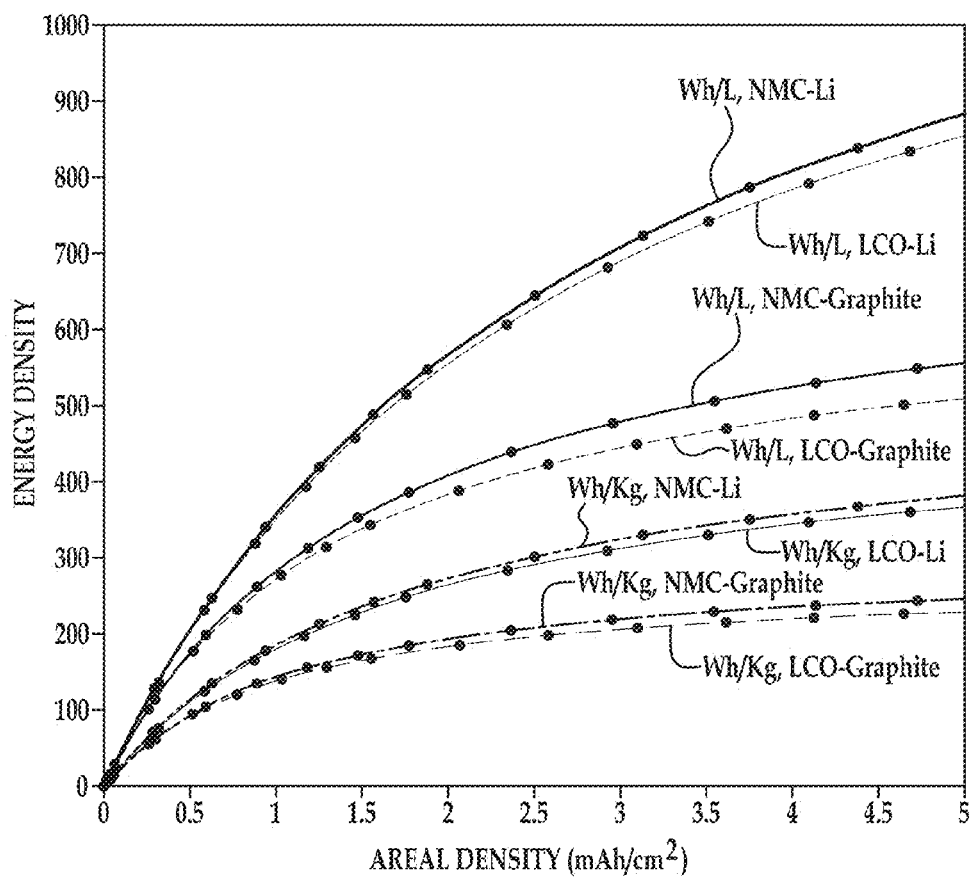
FIG. 17 is a graph depicting a comparison of energy density vs. areal loading between lithium metal batteries and graphite-based batteries.

FIG. 17 shows the energy-density comparison of Li-LCO and Graphite-LCO vs Li-NMC and Graphite-NMC cells with different cathode loadings. Using the same tool to analyze a 44 KWh battery pack, cell level $/kWh cost of different battery chemistry can been obtained by integrating the specific capacity of the active materials, N/P ratio, electrode formulation, porosity, electrode loading and processing, etc. The calculated costs are $207/kWh, $172/kWh, $179/kWh, and $145/kWh for LCO-graphite, LCO-Li, NMC-graphite, and NMC-Li batteries, respectively. These LMBs have significant lower cost (~$35 less) than the graphite-based batteries due to its higher energy density at the cell level. Furthermore, the NMC-based batteries also show lower cost (~$27 less) than LCO-based batteries due to the lower price of NMC ($27/Kg), compared to LCO ($35/Kg), and higher cathode cost ratio (~60%) at the cell level.

Based on the design presented above, single-layer pouch cells may be fabricated based on the parameters established from the coin cell tests. To meet the target energy density of 750 Wh·L$^{-1}$, the cathode loading is estimated to be 4 mAh·cm$^{-2}$. Such a mass loading may result in high resistance and low rate performance, which may be overcome by optimizing parameters affecting the electronic conductivity of the electrodes, such as thickness, porosity, and the amount and type of conducting agents used. In addition, electrolyte films with an area around 3 cm×4 cm may be fabricated. The composition and processing procedure of making such electrolytes may be optimized to achieve sufficient mechanical strength and pressure tolerance. Suitable pressure may be used during the electrochemical studies of the pouch cells, such that the contact resistance could be minimized while avoiding decomposition of the electrolytes and the electrodes. Systematic electrochemical studies may be conducted to achieve the gravimetric and volumetric capacity, Coulombic efficiency, cycling life, rate capability, and other performance target.

Multi-layer pouch cells with 1 Ah capacity may also be fabricated using 9 layers of cathodes (with an area of 3 cm×4 cm and loading of 4 mAh·cm$^{-2}$ per layer). The abuse tolerance, as well as the ability of blocking dendrite growth, may be investigated under normal operation conditions and "off-normal" conditions. Simulated abusive events, such as mechanical, electrical, and thermal abuse, may also be applied to the cells, and their responses recorded and analyzed.

Example 2

A liquid electrolyte of 1M LiBF$_4$ in ethylene carbonate and ethylmethyl carbonate (1:1 volume ratio EC:EMC) was used as a comparative example. Examples of the electrolyte structure were formed by soaking HKUST-1 MOF material (purchased from BASF Corp.) in a non-aqueous liquid electrolyte composed of LiBF$_4$ dissolved in ethylene carbonate, ethyl methyl carbonate, (1:1 volume ratio EC:EMC).

Coins cells were formed with the comparative example liquid electrolyte, and with different examples of the electrolyte structure. Each coin cell included a LiCoO$_2$ (LCO) positive electrode and a lithium metal (Li) negative electrode.

The comparative example coin cell and the example coin cells were tested for ionic conductivity. In the different example coin cells, the electrolyte structure was tested i) when the MOF structure was flooded with the non-aqueous liquid electrolyte (flooded means that when measuring the ionic conductivity, extra non-aqueous liquid electrolyte was added to the coin cell, ii) when the surface of the electrolyte structure was dry (a surface dried electrolyte structure means the structure's surface is liquid free, however, if pressed at high pressure, liquid electrolyte can still be squeezed out), and iii) when the electrolyte structure had been vacuum dried (vacuum dried means the surface of the electrolyte structure was exposed to high vacuum to remove any free solvent that was not immobilized by coordinating with the unsaturated metal center inside of the pores).

Figure 18:
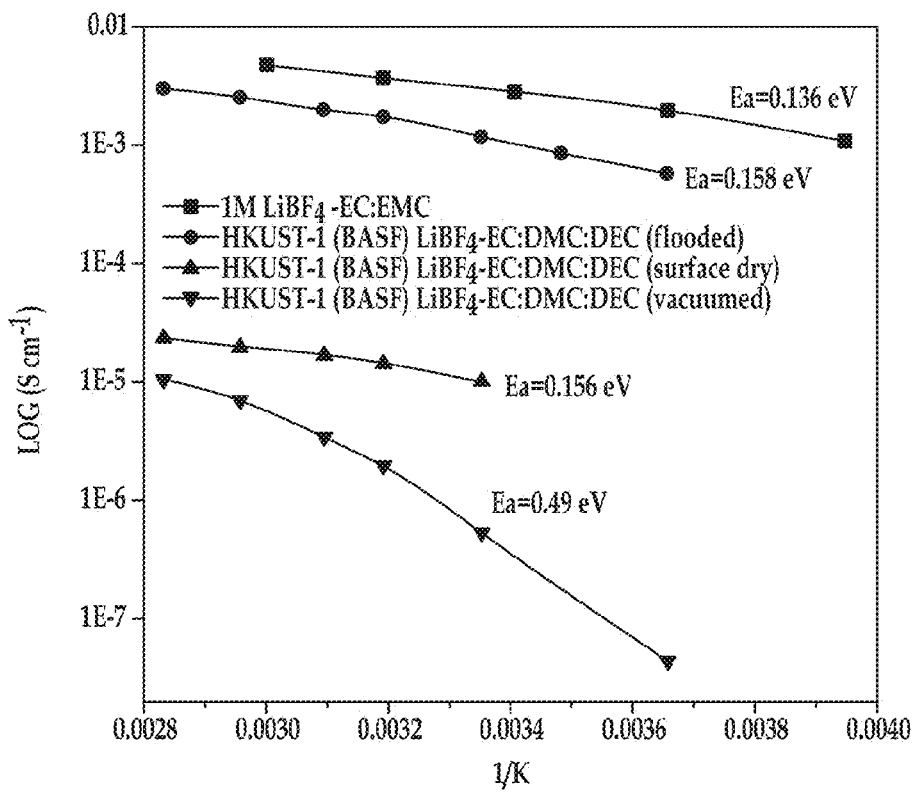
FIG. 18 is a graph depicting the ionic conductivity (Log (Scm$^{-1}$) versus reciprocal temperature (1/K) of a comparative electrolyte (LiBF$_4$ in ethylene carbonate and ethylmethyl carbonate) and an example electrolyte in different states (flooded, surface dry, and vacuumed)

FIG. 18 illustrates the ionic conductivity results (versus temperature, 1/K) for the various coin cells. The ● curve illustrates the ionic conductivity of the MOF that is flooded with electrolyte. The ▲ curve illustrates the ionic conductivity of the electrolyte structure that had a dry surface. The ▼ curve illustrates the ionic conductivity of the electrolyte structure that was vacuum dried. The ■ curve illustrates the ionic conductivity of the comparative liquid electrolyte. As can be understood from the curves, the ionic conductivity and the activation energy Ea (shown as eV) of the ● curve are similar to the ionic conductivity and the activation energy Ea of the ■ curve for the comparative liquid electrolyte. This is likely due to the fact that the non-aqueous liquid electrolyte was present in the coin cell associated with the ● curve. Further, the dry surface electrolyte structure, illustrated by the ▲ curve, showed no signs of free solvents and had an ionic conductivity at $10^4$ S/cm order.

Example 3

Examples of different electrolyte structures were prepared. A first example was formed by soaking HKUST-1 MOF material (purchased from Aldrich) in a non-aqueous liquid electrolyte composed of LiTFSI in propylene carbonate (PC). A second example was formed by soaking HKUST-1 MOF material (received from UCLA) in a non-aqueous liquid electrolyte composed of $LiClO_4$ in propylene carbonate (PC). A third example was formed by soaking HKUST-1 MOF material (purchased from BASF Corp.) in a non-aqueous liquid electrolyte composed of LiTFSI in ethylene carbonate, dimethyl carbonate, and diethyl carbonate (1:1:1 volume ratio PC:DMC:DEC). A fourth example was formed by soaking HKUST-1 MOF material (purchased from BASF Corp.) in a non-aqueous liquid electrolyte composed of $LiBF_4$ in ethylene carbonate, dimethyl carbonate, and diethyl carbonate (1:1:1 volume ratio PC:DMC:DEC). The various samples were dried.

Coins cells were formed with the different examples of the electrolyte structure. Each coin cell included a $LiCoO_2$ (LCO) positive electrode and a lithium metal (Li) negative electrode.

Figure 19:
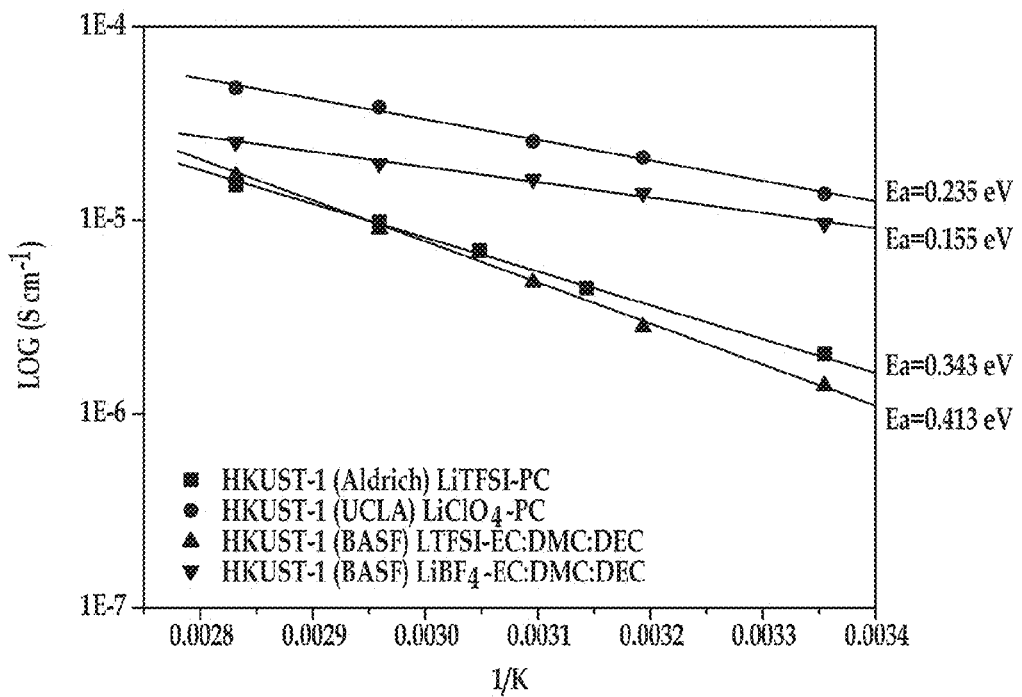
FIG. 19 is a graph depicting the ionic conductivity (Log (Scm$^{-1}$) versus reciprocal temperature (1/K) of several examples of the electrolyte disclosed herein.

The coin cells were tested for ionic conductivity. FIG. 19 illustrates the ionic conductivity results (versus temperature, 1/K) for the various coin cells. Each of the different example electrolyte structures exhibited a suitable ionic conductivity and activation energy (Ea). The ● line, which included the small volume anion, $ClO_4^-$, had the highest ionic conductivity, which may be attributed to the MOF structure having small particle size and having some surface defects, which contributes to larger pores, which can accommodate more anions and solvated cations.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.4 nm to about 3.7 nm should be interpreted to include not only the explicitly recited limits of about 0.4 nm to about 3.7 nm, but also to include individual values, such as 0.5 nm, 2.25 nm, 3.5 nm, etc., and sub-ranges, such as from about 1 nm to about 3 nm, from about 2 nm to about 2.75 nm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. An electrolyte structure, comprising:
   a metal organic framework (MOF) material defining a plurality of pores;
   anions bound to respective metal atoms of the MOF material, wherein the bound anions are located within each of the plurality of pores; and
   solvated cations present within each of the plurality of pores, wherein the MOF material is selected from the group consisting of HKUST-1, Mil-100-A1, Mil-100-Fe, MOF-73, and In-MOF.

2. The electrolyte structure as defined in claim 1 wherein the solvated cations are selected from the group consisting of lithium cations, sodium cations, zinc cations, magnesium cations, and combinations thereof.

3. The electrolyte structure as defined in claim 1 wherein the anions are $ClO_4^-$ anions.

4. A method of forming an electrolyte structure, the method comprising:
   providing a metal organic framework (MOF) material defining a plurality of pores, wherein the MOF material is selected from the group consisting of HKUST-1, Mil-100-Al, Mil-100-Fe, MOF-73, and In-MOF;
   soaking the MOF material in a liquid electrolyte having a metal salt dissolved therein, thereby i) causing anions of the metal salt to bind to respective metal atoms of the MOF material within each of the plurality of pores to form ionic channels therein, and ii) freeing solvated cations of the metal salt within each of the plurality of pores; and
   removing at least some of the liquid electrolyte to form the electrolyte structure.

5. The method as defined in claim 4, further comprising applying pressure to the electrolyte structure to form a shaped body.

6. The method as defined in claim 4, further comprising dissolving a plurality of metal salt molecules in a non-aqueous inert solvent to produce the liquid electrolyte.

7. The method as defined in claim 4 wherein: a weight ratio of the MOF material to the liquid electrolyte ranges from 10:1 to 1:10.

8. The method as defined in claim 4 wherein prior to soaking the MOF material in the liquid electrolyte, the method further comprises:
   degassing the MOF material to remove absorbed water molecules; or
   activating the MOF material under vacuum at an elevated temperature to remove absorbed water molecules.

9. The method as defined in claim 4 wherein the removing of at least some of the liquid electrolyte is accomplished under vacuum.

10. A rechargeable lithium-based battery, comprising:
    a pair of electrodes; and
    a separator and electrolyte structure disposed between the electrodes, the separator and electrolyte structure including:
    a metal organic framework (MOF) material defining a plurality of pores;
    anions bound to respective metal atoms of the MOF material, wherein the bound anions are located within each of the plurality of pores; and
    solvated cations present within each of the plurality of pores, wherein the MOF material is selected from the group consisting of HKUST-1, Mil-100-Al, Mil-100-Fe, MOF-73, and In-MOF.

11. The rechargeable lithium-based battery as defined in claim 10 wherein the pair of electrodes includes a LiCoO$_2$ (LCO) positive electrode and a lithium metal (Li) negative electrode.

12. The rechargeable lithium-based battery as defined in claim 10 wherein the solvated cations are selected from the group consisting of lithium cations, sodium cations, zinc cations, magnesium cations, and combinations thereof.

13. The rechargeable lithium-based battery as defined in claim 10 wherein the anions are ClO$_4^-$ anions.

* * * * *